US008812773B2

(12) United States Patent
Kim et al.

(10) Patent No.: US 8,812,773 B2
(45) Date of Patent: Aug. 19, 2014

(54) METHOD OF MERGING BLOCKS IN A SEMICONDUCTOR MEMORY DEVICE, AND SEMICONDUCTOR MEMORY DEVICE TO PERFORM A METHOD OF MERGING BLOCKS

(75) Inventors: Min-Seok Kim, Gwangju (KR); Ki-Tae Park, Seongnam-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 612 days.

(21) Appl. No.: 13/114,262

(22) Filed: May 24, 2011

(65) Prior Publication Data
US 2011/0296087 A1    Dec. 1, 2011

(30) Foreign Application Priority Data
May 25, 2010   (KR) .................. 10-2010-0048367

(51) Int. Cl.
*G06F 12/00*   (2006.01)
(52) U.S. Cl.
USPC ............................................. 711/103; 711/159
(58) Field of Classification Search
USPC ........................................................ 711/103
See application file for complete search history.

(56) References Cited

U.S. PATENT DOCUMENTS

| 7,409,473 B2 | 8/2008 | Conley et al. |
| 2008/0104309 A1* | 5/2008 | Cheon et al. .................. 711/103 |
| 2011/0029749 A1* | 2/2011 | Yang et al. ..................... 711/162 |

FOREIGN PATENT DOCUMENTS

| JP | 2005-078378 | 3/2005 |
| JP | 2005-216434 | 8/2005 |

* cited by examiner

*Primary Examiner* — Christian P Chace
*Assistant Examiner* — Hannah A Faye-Joyner
(74) *Attorney, Agent, or Firm* — Stanzione & Kim, LLP

(57) ABSTRACT

In a method of merging blocks in a semiconductor memory device according to example embodiments, a plurality of data are written into one or more first blocks using a first program method. One or more merge target blocks that are required to be merged are selected among the one or more first blocks. A merge-performing block for a block merge operation is selected among the one or more first blocks and one or more second blocks. A plurality of merge target data are written from the merge target blocks into the merge-performing block using a second program method that is different from the first program method.

19 Claims, 19 Drawing Sheets

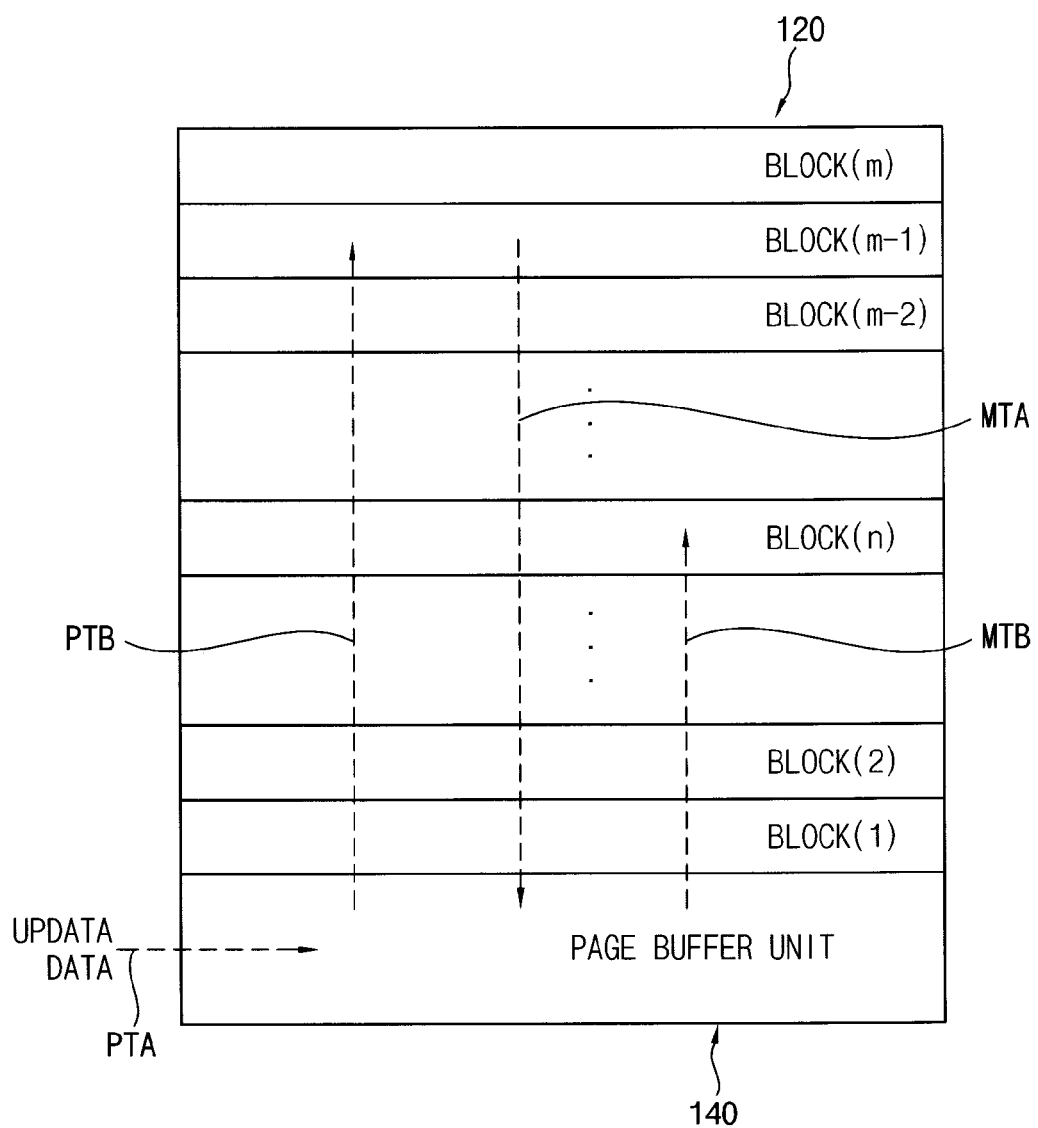

800

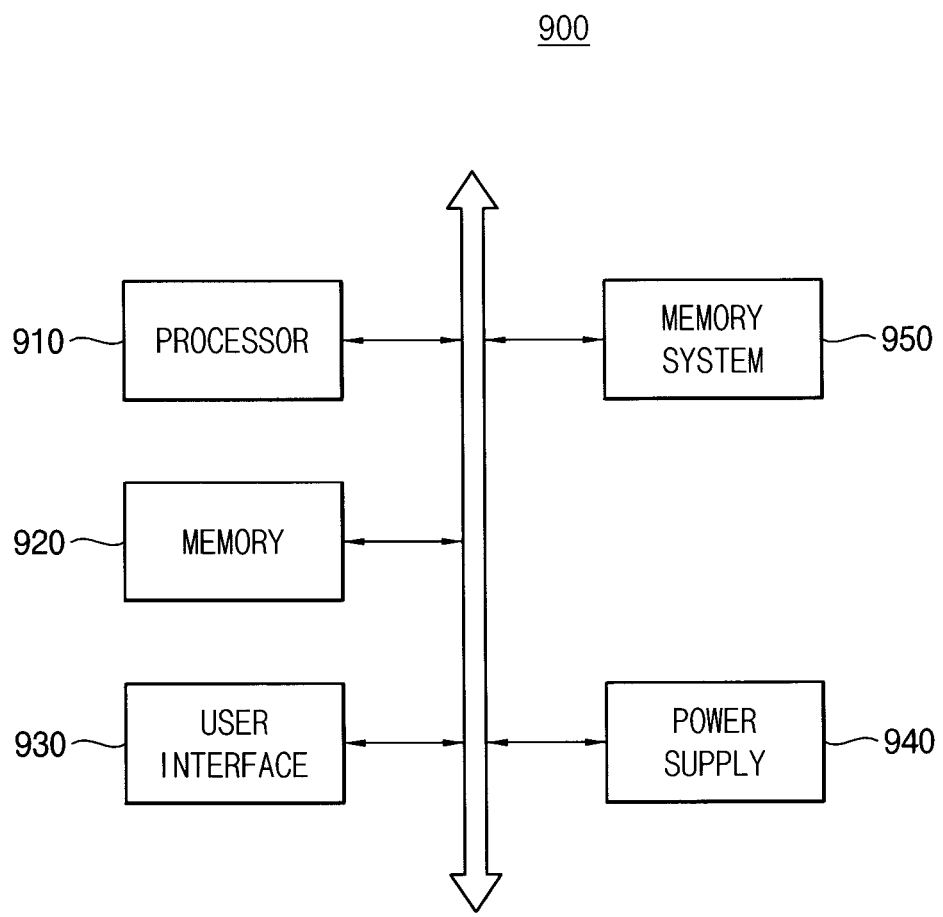

METHOD OF MERGING BLOCKS IN A SEMICONDUCTOR MEMORY DEVICE, AND SEMICONDUCTOR MEMORY DEVICE TO PERFORM A METHOD OF MERGING BLOCKS

CROSS-REFERENCE TO RELATED APPLICATIONS

This application claims priority under 35 U.S.C. §119 from Korean Patent Application No. 2010-0048367, filed on May 25, 2010, in the Korean Intellectual Property Office (KIPO), the entire content of which is incorporated herein by reference in its entirety.

BACKGROUND OF THE INVENTION

1. Field of the Invention

Example embodiments according to the present general inventive concepts relate to semiconductor memory devices. More particularly, the example embodiments relate to methods of merging blocks in semiconductor memory devices, and semiconductor memory devices that perform methods of merging blocks.

2. Description of the Related Art

Semiconductor memory devices can be roughly divided into volatile memory devices and nonvolatile memory devices according to whether they retain stored data when disconnected from power. Recently, as electronic devices require lower power consumption and smaller size, a NAND flash memory device has been widely used as the nonvolatile memory device. In the NAND flash memory device, a program operation is performed on a page basis, and an erase operation is performed on a block basis.

Generally, since the NAND flash memory device, unlike hard disc drives, does not support an overwrite operation, data modification in the NAND flash memory device should be performed in a manner that programs data of a page to be modified into a free page of the same block or another block with data modification, and assigns an address of the newly programmed page to the modified data by a flash translation layer (FTL). Accordingly, the page that previously stored the data becomes an invalid page, and the page that stores the modified data becomes a valid page. That is, the invalid page may coexist with the valid page in one block.

To obtain free blocks, a block merge operation can be performed by merging valid pages distributed in a plurality of blocks and by erasing unnecessary invalid pages. However, overall performance of the NAND flash memory device may drastically decrease due to the time required to perform the block merge operation.

SUMMARY OF THE INVENTION

Some example embodiments provide a method of merging blocks in a semiconductor memory device capable of improving overall performance of the semiconductor memory device.

Some example embodiments provide a semiconductor memory device capable of improving overall performance of the semiconductor memory device.

Additional features, utilities and advantages of the present general inventive concept will be set forth in part in the description which follows and, in part, will be obvious from the description, or may be learned by practice of the general inventive concept.

In a method of merging blocks in a semiconductor memory device according to example embodiments, a plurality of data are written into one or more first blocks using a first program method. One or more merge target blocks that require to be merged are selected among the first blocks. A merge-performing block for performing a block merge operation is selected among the first blocks and one or more second blocks. A plurality of merge target data are written from the merge target blocks into the merge-performing block using a second program method that is different from the first program method.

In some embodiments, the plurality of merge target data may be erased from the merge target blocks.

In some embodiments, the semiconductor memory device may correspond to a NAND flash memory device including a plurality of single level memory cells or a plurality of multi level memory cells.

In some embodiments, the plurality of data and the plurality of merge target data may be written on a page basis, and the plurality of data and the plurality of merge target data may be erased on a block basis.

In some embodiments, program parameters of the first program method may be different from program parameters of the second program method.

In some embodiments, the first program method may correspond to a shadow program method, and the second program method may correspond to a reprogram method.

In some embodiments, the plurality of merge target data may be written from the merge target blocks into the merge-performing block via a page buffer unit.

In some embodiments, the first program method may correspond to an on-chip buffered program method using a first incremental step pulse, and the second program method may correspond to the on-chip buffered program method using a second incremental step pulse.

In some embodiments, the plurality of merge target data may be written from the merge target blocks to the merge-performing block via a page buffer unit and a single level memory cell block.

In some embodiments, the first incremental step pulse may have a voltage level lower than that of the second incremental step pulse.

In some embodiments, the first blocks may include at least one data block and at least one log block.

In some embodiments, the second blocks may include at least one free block.

In some embodiments, the merge target blocks may become free blocks after the plurality of merge target data are erased from the merge target blocks, and the merge-performing block may become a data block after the plurality of merge target data are written into the merge-performing block.

According to example embodiments, a semiconductor memory device includes a memory cell array, a page buffer unit, a voltage generator, a row decoder and a program controller. The memory cell array includes a plurality of memory cells coupled to a plurality of wordlines and a plurality of bitlines. The page buffer unit is configured to operate as a write driver or as a sense amplifier according to an operation mode of the semiconductor memory device. The voltage generator is configured to generate a plurality of wordline voltages applied to the wordlines according to the operation mode. The row decoder is configured to apply the wordline voltages to the wordlines based on a row address. The program controller is configured to select a first program method or a second program method according to the operation mode, and is configured to control the page buffer unit, the voltage generator and the row decoder.

In some embodiments, the semiconductor memory device may correspond to a NAND flash memory device including a plurality of single level memory cells or a plurality of multi level memory cells.

In some embodiments, the operation mode may include a write operation mode, a read operation mode, an erase operation mode and a block merge operation mode.

In some embodiments, program parameters of the first program method may be different from program parameters of the second program method.

In some embodiments, the first program method may be performed in the write operation mode, and the second program method may be performed in the block merge operation mode.

In some embodiments, the first program method may correspond to a shadow program method, and the second program method may correspond to a reprogram method.

In some embodiments, the first program method may correspond to an on-chip buffered program method using a first incremental step pulse of a relatively low voltage level, and the second program method may correspond to the on-chip buffered program method using a second incremental step pulse of a relatively high voltage level.

In a method of merging blocks in a semiconductor memory device according to example embodiments, an external data from an external device is loaded into a buffer unit, the external data from the buffer unit is written into a merge target block as a merge target data, the merge target data from a merge target block is loaded into a buffer unit, and the merge target data from the buffer unit is written into merge-performing block.

The merge target data from the buffer unit may be loaded into a single level memory cell block, and the merge target data from the single level memory cell block may be loaded into the buffer unit.

The single level memory cell block operates at a higher speed and has a lower cell density than the merge target block and the merge-performing block.

The first program method and the second program method have different parameters, the parameters including at least one of incremental step pulse program (ISPP) conditions, verify/read levels and sensing schemes.

The first program method is a shadow program method including steps of performing a least significant bit program on a plurality of multi level memory cells, and performing a most significant bit program on the plurality of multi level memory cells.

The second program method is a reprogram method including steps of performing a pre-program on a plurality of multi level memory cells, and performing a reprogram on the plurality of multi level memory cells.

In a method of merging blocks in a semiconductor memory device according to example embodiments, the method includes writing a plurality of data into one or more first blocks using a first program method, determining a merge target block among the one or more first blocks for a block merge operation, and performing the block merge operation by writing merge target data from the merge target blocks into a merge-performing block using a second program method that is different from the first program method.

The merge target block includes at least one invalid page that is not accessible. The first program method uses a first incremental step pulse and the second program method uses a second incremental step pulse. The first incremental step pulse and the second incremental step pulse have different voltage levels.

A semiconductor memory device according to example embodiments includes a memory cell array including a plurality of data blocks made of memory cells, and a program controller configured to select between a first program method for a normal program operation on one or more of the data blocks and a second program method for a block merge operation on one or more of the data blocks, the second program method being different from the first program method.

The semiconductor memory device further includes a page buffer unit configured to store data from or to be stored in one or more of the data blocks, wherein the program controller is further configured to control the page buffer unit based on the selection between the first program method and the second program method.

The program controller is configured to select between the first program method and the second program method by changing one or more program parameters. The one or more program parameters include incremental step pulse program conditions, verify/read levels, and sensing schemes.

The first program method is a shadow program method configured to perform a least significant bit program that programs the memory cells to have one of previous threshold voltage states corresponding to N bits, and to perform a most significant bit program that programs the memory cells to have one of final threshold voltage states corresponding to N+1 bits. The second program method is a reprogram method configured to perform a pre-program that programs the memory cells to have coarse threshold voltage distributions, and to perform the reprogram that programs the memory cells to have fine threshold voltage distributions that are narrower than the coarse threshold voltage distributions.

BRIEF DESCRIPTION OF THE DRAWINGS

Illustrative, non-limiting example embodiments will be more clearly understood from the following detailed description taken in conjunction with the accompanying drawings.

These and/or other features, utilities and advantages of the present general inventive concept will become apparent and more readily appreciated from the following description of the embodiments, taken in conjunction with the accompanying drawings of which:

FIG. 5 is a diagram illustrating a merge step of FIG. 4.

FIG. 17 is a block diagram illustrating a computing system including a memory system of FIG. 12.

DETAILED DESCRIPTION OF THE PREFERRED EMBODIMENTS

Figure 1:
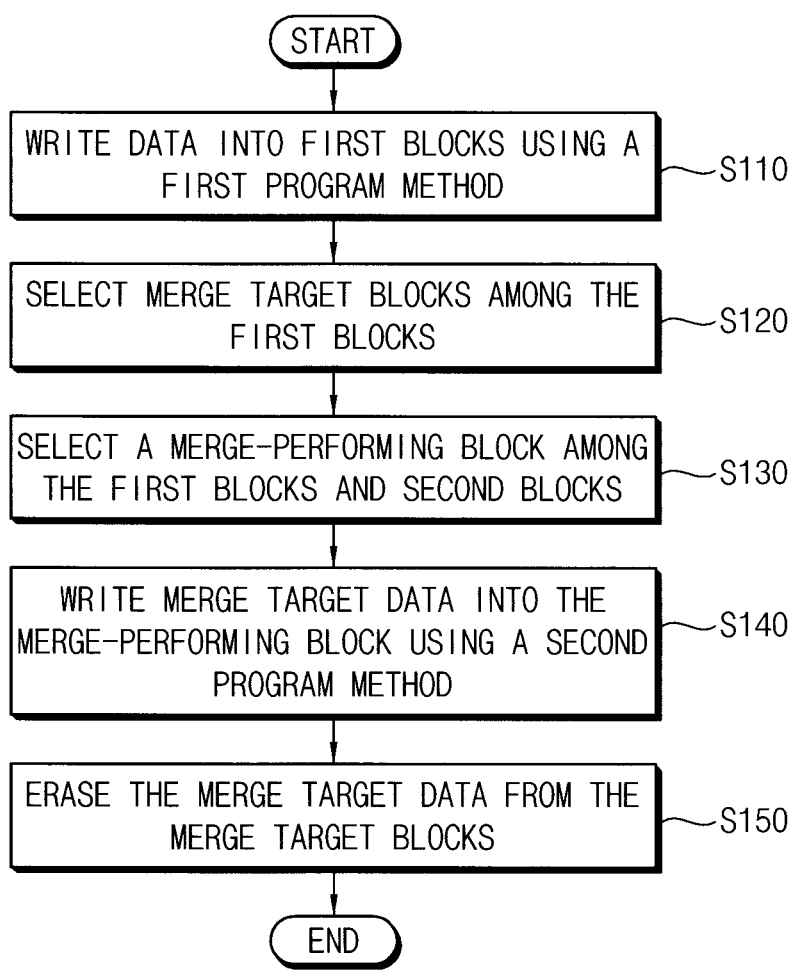
FIG. 1 is a flow chart illustrating a method of merging blocks in a semiconductor memory device according to example embodiments.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. The present general inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or indirectly on, connected or coupled to the other element (e.g., layer or intervening elements or layers may be present). In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, for example, a first element, component, region, layer or section discussed below could be termed a second element, component, region, layer or section without departing from the teachings of the present general inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on a reference for the orientation. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present general inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present general inventive concept.

Unless otherwise defined, all terms (including technical and scientific terms) used herein have the same meaning as commonly understood by one of ordinary skill in the art to which this present general inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of merging blocks in a semiconductor memory device according to example embodiments.

Referring to FIG. 1, in a method of merging blocks in a semiconductor memory device, a plurality of data are written into one or more first blocks using a first program method at operation S110, one or more merge target blocks that are required to be merged are selected among the first blocks at operation S120, a merge-performing block for performing a block merge operation is selected among the first blocks and one or more second blocks at operation S130, and at operation S140 a plurality of merge target data are written from the merge target blocks into the merge-performing block using a second program method that is different from the first program method. After the plurality of merge target data are written into the merge-performing block, the plurality of merge target data may be erased from the merge target blocks at operation S150.

Since a NAND flash memory device, unlike hard disc drives, does not support an overwrite operation, data stored in memory cells of the NAND flash memory device cannot be directly modified. To modify data in the NAND flash memory device, the memory cells may be initialized by erasing data stored in the memory cells, and modified data may be written again into the memory cells. This approach is commonly referred as an "erase before program operation". In the NAND flash memory device, a program operation and a read operation are performed on a page basis, and an erase operation is performed on a block basis. Accordingly, it is inefficient to perform the erase before program operation to modify a portion of data stored in a block since the entire data stored in the block should be erased during the erase operation of the erase before program operation.

To reduce this inefficiency, blocks in the NAND flash memory device may be divided into data blocks, log blocks, and free blocks. A program operation, a read operation, an erase operation and a block merge operation may be performed based on the divided data blocks, log blocks, and free blocks. For example, data may be programmed into a data block, and modified data may be programmed into a log block. In the NAND flash memory device, an address mapping is performed by a flash translation layer (FTL) to manage the data. The FTL may allow a user to use the NAND flash memory device as a hard disc drive. For example, the FTL may perform the address mapping, a block merge operation, a power drop management, a bad block management, a wear leveling, etc. Hereinafter, the address mapping that converts a logical address into a physical address, and the block merge operation that extracts valid data from the data block and the log block, and erases invalid data to obtain the free block will be described in detail below.

In the NAND flash memory device, since data in unit of page (hereinafter referred to as "page data") are written into the data block, and modified page data are not directly written into the page data but are written into the log block, an invalid page containing invalid page data may coexist with a valid page containing valid page data in one block. In this case, for example, the invalid page containing the invalid page data may not be accessed, whereas the valid page containing the valid page data may be accessed. The NAND flash memory device may merge valid pages distributed in a plurality of blocks and may erase unnecessary invalid pages by performing the block merge operation using the FTL. Accordingly, free blocks including only programmable free pages that are in initial states can be obtained. For example, the NAND flash memory device may generate a new data block by moving valid pages from data blocks and log blocks related to the data blocks to one free block, and may switch the previous data blocks and the previous log blocks to free blocks.

During the block merge operation in the NAND flash memory device, the valid pages in merge target blocks (e.g., data blocks that are required to be merged and log blocks related to the data blocks) may be written into a merge-performing block (i.e., a selected free block for performing the block merge operation) via a page buffer unit including a plurality of page buffers. In a conventional NAND flash memory device, since a program method of a block merge operation is substantially the same as a program method of a normal program operation, particular environments and conditions of the block merge operation cannot be considered. However, in a method of merging blocks in a semiconductor memory device according to example embodiments, a program method of a block merge operation may be different from a program method of a normal program operation because respective environments and conditions are considered for the block merge operation and the normal program operation. For example, the program methods of the block merge operation and the normal program operation may have different program parameters, such as incremental step pulse program (ISPP) conditions, verify/read levels, sensing schemes, etc., from each other. Hereinafter, the method of merging blocks in a semiconductor memory device according to example embodiments will be described in detail below.

A plurality of data are written into one or more first blocks using a first program method at operation S110. The first blocks may include a plurality of free pages, and the plurality of data may be written into the free pages of the first blocks on a page basis. The first program method corresponds to a program method of a normal program operation. In some embodiments, the first blocks may include at least one data block and at least one log block. For example, the first blocks may include at least one data block where new page data are written and at least one log block where modified page data are written.

Once a block merge operation is required to be performed in a NAND flash memory device, one or more merge target blocks (e.g., data blocks and log blocks related to the data blocks) that are required to be merged are selected among the first blocks at operation S120. In some embodiments, the NAND flash memory device may select, as the merge target blocks, at least one data block including a valid page and an invalid page and at least one log block including a valid page and/or an invalid page. Since the NAND flash memory device writes new page data into the data block, and writes modified page data into the log block, an invalid page may coexist with a valid page in one block. Thus, the merge target blocks may be selected among the data blocks including the invalid page as well as the valid page and the log blocks related to the data blocks.

A merge-performing block for performing the block merge operation is selected among the first blocks and one or more second blocks at operation S130. In some embodiments, the first blocks may include at least one data block and at least one log block, and the second blocks may include at least one free block. That is, the merge-performing block may be selected from the first blocks including at least one data block and at least one log block, or may be selected from the second blocks including at least one free block. For example, if the block merge operation is performed in a form of switch merge or in a form of copy merge, the merge-performing block may be selected from the first blocks including at least one data block and at least one log block. If the block merge operation is performed in a form of full merge, the merge-performing block may be selected from the second blocks including at least one free block. Examples of the switch merge, the copy merge, and the full merge are shown later in FIGS. 3A-3B.

A plurality of merge target data in the merge target blocks are written into the merge-performing block using a second program method at operation S140. The merge-performing block may include a plurality of free pages, and the plurality of merge target data may be written into the merge-performing block on a page basis. The second program method corresponds to a program method of the block merge operation. In some embodiments, the plurality of merge target data may be written via a page buffer unit. In other embodiments, the plurality of merge target data may be written via the page buffer unit and a single level memory cell block.

In the method of merging blocks according to example embodiments, the program method of the block merge operation is different from the program method of the normal program operation, thereby improving threshold voltage distributions of memory cells and an operation speed. The first program method of the normal program operation and the second program method of the block merge operation may have different program parameters from each other. For example, different operations (e.g. the normal program operation and the block merge operation) may run more efficiently because different program parameters are used for different types of operations, instead of using the same parameters and/or the same method for different types of operations. In some embodiments, the first program method may correspond to a shadow program method, and the second program method may correspond to a reprogram method. In other embodiments, the first program method may correspond to an on-chip buffered program method using a first incremental step pulse of a relatively low voltage level, and the second program method may correspond to the on-chip buffered program method using a second incremental step pulse of a relatively high voltage level. The first program method or the second program method may be selectively performed by changing the program parameters thereof.

After the plurality of merge target data are written into the merge-performing block, the plurality of merge target data may be erased from the merge target blocks at operation S150. Since valid pages in the merge target blocks are moved to the merge-performing block, the NAND flash memory device may erase the plurality of merge target data in the merge target blocks that are previous data blocks and/or previous log blocks to switch the merge target blocks to free blocks. An erase operation may be performed on the merge target blocks on a block basis. By the method of merging blocks according to example embodiments, the semiconductor memory device can obtain sufficient free blocks, and overall performance of the semiconductor memory device can be improved.

Figure 2:
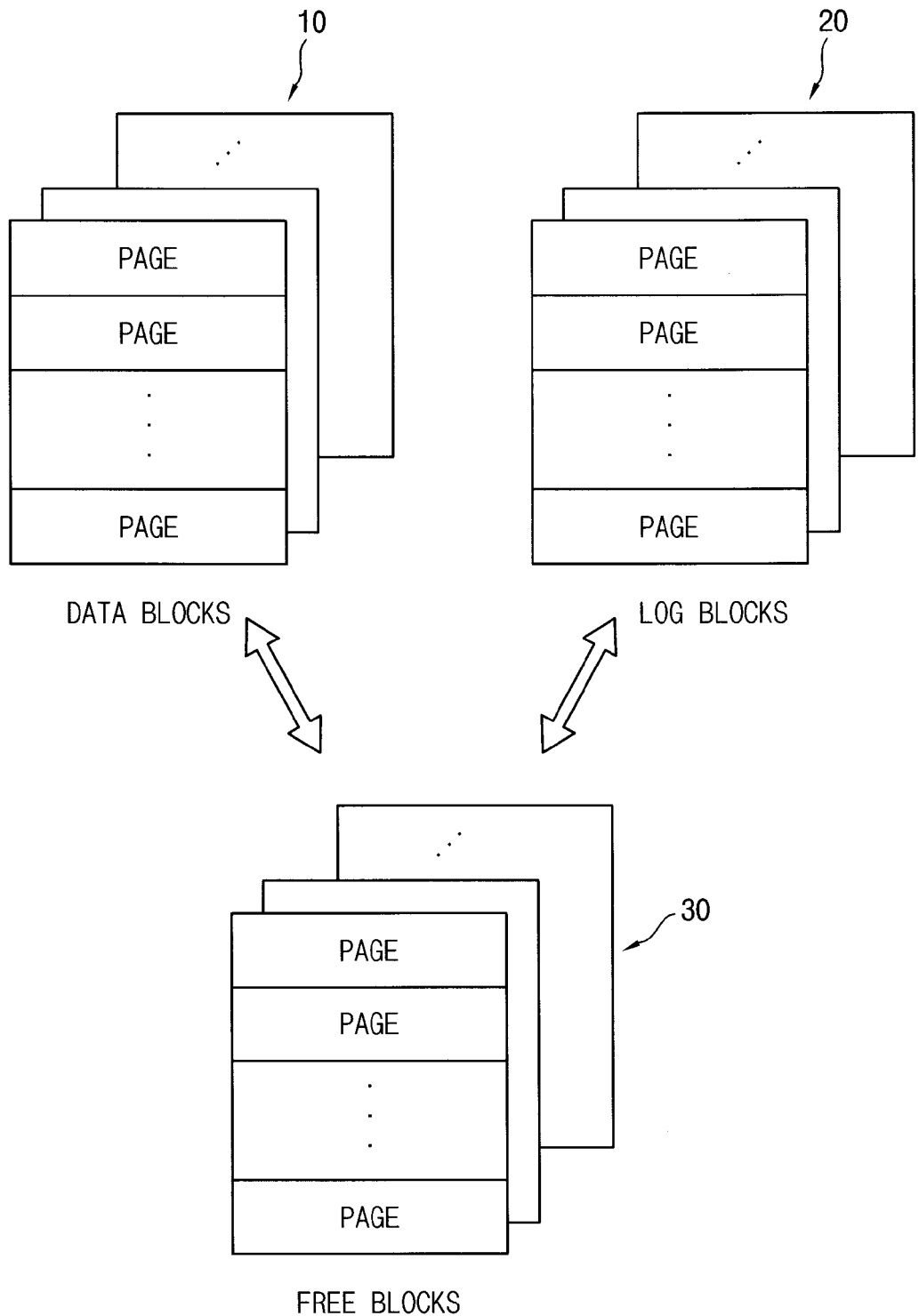
FIG. 2 is a diagram illustrating blocks in a semiconductor memory device illustrating a block merge method of FIG. 1.

FIG. 2 is a diagram illustrating blocks in a semiconductor memory device illustrating a block merge method of FIG. 1.

Referring to FIG. 2, blocks of a semiconductor memory device may include data blocks 10, log blocks 20 and free blocks 30. The data blocks 10, the log blocks 20 and the free blocks 30 may be distinguished not physically but logically. In some embodiments, the blocks of the semiconductor memory device may further include meta blocks for storing address mapping information that is changed by a block merge operation.

The semiconductor memory device may include a memory cell array having the blocks each including a plurality of pages. A page is a unit of a read operation and a program operation in a NAND flash memory device, and each page may include a data region and a spare region. In some embodiments, page data may be stored in the data region, and a logical offset of a corresponding page may be stored in the spare region. A block is a unit of an erase operation in the NAND flash memory device, and the blocks may be classified into the data blocks 10, the log blocks 20 and the free blocks 30. Here, the data blocks 10 indicate blocks where page data are written, the log blocks 20 indicate blocks where modified page data are written, and the free blocks 30 indicate blocks where no page data are written, and thus programmable. Thus, the data blocks 10 are allocated to program the page data, the log blocks 20 are allocated to program the modified page data, and the free blocks 30 may be switched to the data blocks 10 or the log blocks 20 according to circumstances. Since pages of the log blocks 20 store updated page data, which may be newer than the page data stored in corresponding pages of the data blocks 10, the pages of the log blocks 20 may be accessed rather than the corresponding pages of the data blocks 10. In some embodiments, each log block 20 may be related to a corresponding data block 10.

In the data blocks 10 and the log blocks 20, valid pages and invalid pages may coexist. For example, if a portion of pages in the log blocks 20 are accessed rather than a portion of pages in the data blocks 10, the portion of pages in the log blocks 20 may be regarded as valid pages, and the portion of pages in the data blocks 10 may be regarded as invalid pages. In another example, once page data in a portion of pages in the log blocks 20 are modified to page data in another portion of pages in the log blocks 20, this other portion of pages in the log blocks 20 may be accessed rather than the portion of pages in the log blocks 20. In this case, this other portion of pages in the log blocks 20 may be regarded as valid pages, and the portion of pages in the log blocks 20 may be regarded as invalid pages.

Since the data blocks 10, the log blocks 20 and the free blocks 30 are not physically distinguished (but are rather logically distinguished), respective blocks of the same type may be physically located adjacent to each other, or may be physically dispersed over a memory cell array. Thus, the physical locations of the respective blocks may not depend on the type of the blocks.

Figure 3A:
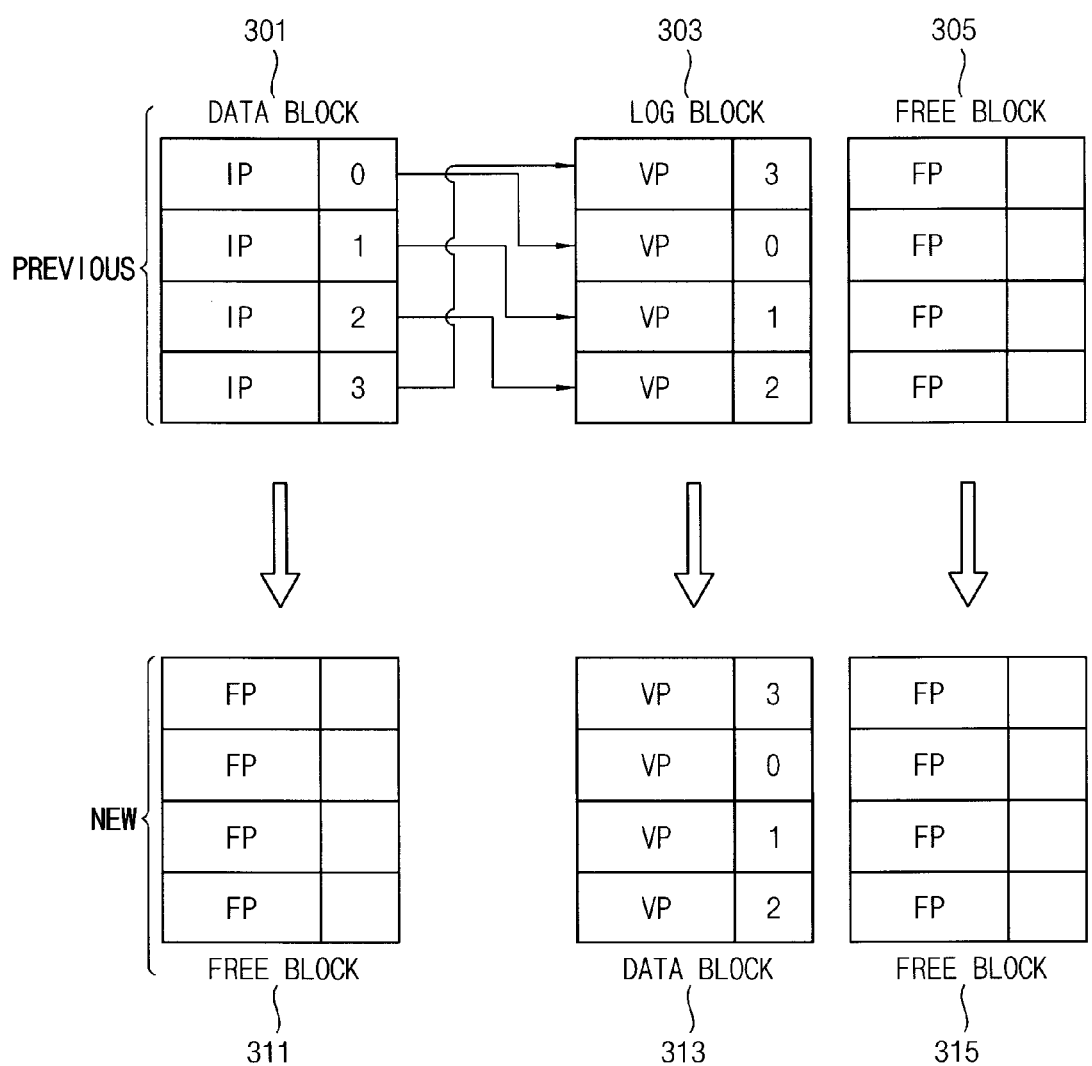
FIGS. 3A through 3C are diagrams illustrating examples of blocks merged by a block merge method of FIG. 1.

FIG. 3A is a diagram illustrating an example of blocks merged by a block merge method of FIG. 1.

FIG. 3A illustrates an example of switch merge performed according to the block merge method of FIG. 1. In FIG. 3A, IP represents an invalid page, VP represents a valid page, and FP represents a free page. Numbers 0 through 3 represent logical offsets of pages. In the example illustrated in FIG. 3A, each block includes four physical pages.

The switch merge is typically performed in a case where a previous data block includes only invalid pages IPs, and the number of valid pages VPs in a previous log block is the same as the number of physical pages in the previous log block. In the switch merge, address mapping information may be updated, and the previous log block may be switched to a new data block. Further, the invalid pages IPs may be removed from the previous data block, and the previous data block may be switched to a new free block. In some embodiments, the switch merge may be performed by updating only the address mapping information when the previous log block is switched to the new data block. In this example, the previous data block 301 only includes invalid pages IPs having an order 0, 1, 2 and 3, and the previous log block 303 may include valid pages VPs having an order 3, 0, 1 and 2. As indicated by the arrows, in this example, the data in the previous data block 301 is written into the log block 303. The previous data block 301 with invalid pages IPs are then switched to a new free block 311 with free pages, and the previous log block 303 with valid pages VPs is switched to a new data block 313. In this example, since the valid pages VPs in the previous log block 303 are not newly programmed, an order of the valid pages VPs in the new data block 313 may be the same as an order (e.g., 3, 0, 1, and 2) of the valid pages VPs in the previous log block 303. The previous free block 305 in this example is not switched, and thus stays as a free block (e.g. the new free block 315) after the switch merge. In other examples, the switch merge may be performed in a manner that programs the valid pages VPs of the previous log block into a selected free block when the previous log block is switched to the new data block. In this case, the valid pages VPs in the new data block may be sorted into ascending order (e.g., 0, 1, 2, and 3).

When the valid pages VPs of the previous log block are newly programmed into the selected free block, the valid pages VPs may be programmed using a program method that is different from a program method of a normal program operation according to the block merge operation of FIG. 1.

Figure 3B:
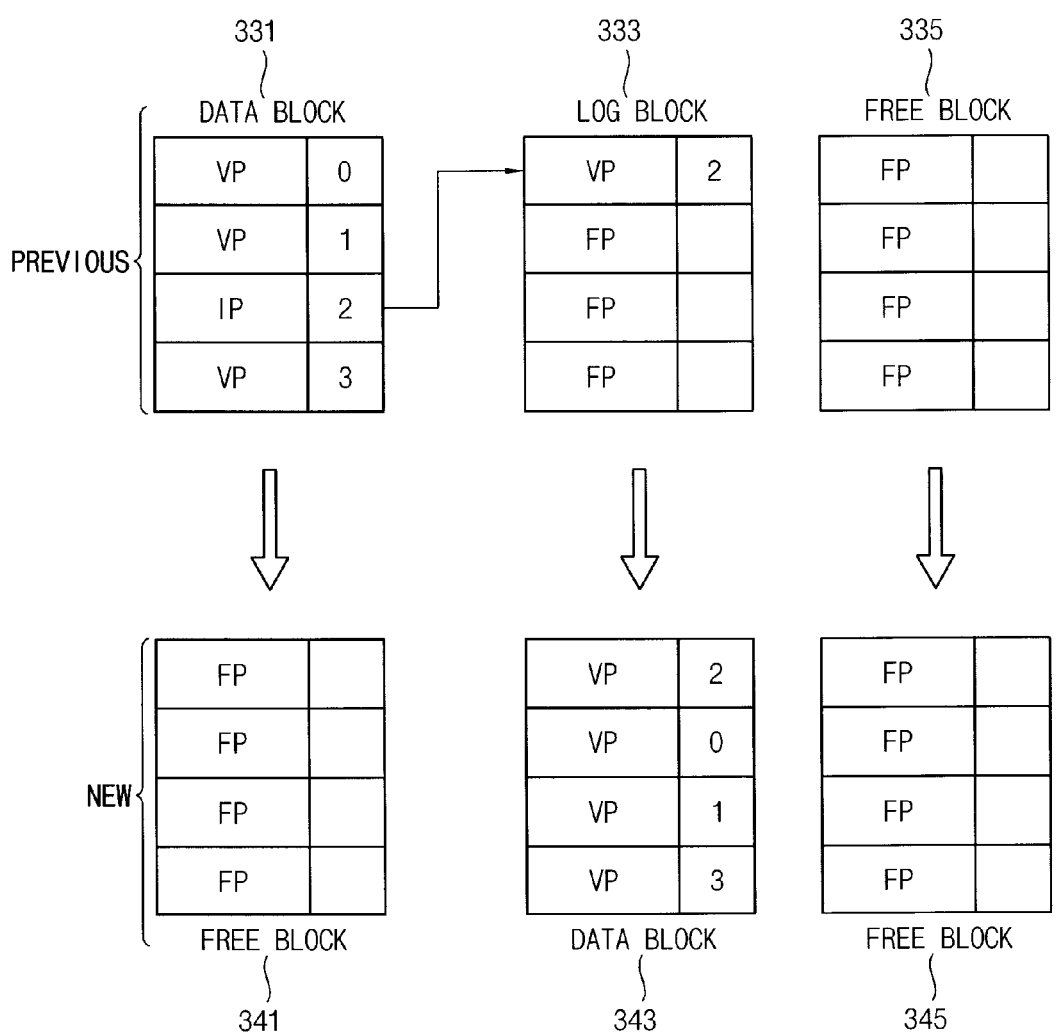

FIG. 3B is a diagram illustrating another example of blocks merged by a block merge method of FIG. 1.

FIG. 3B illustrates an example of copy merge performed according to the block merge method of FIG. 1. In FIG. 3B, IP represents an invalid page, VP represents a valid page, and FP represents a free page. Numbers 0 through 3 represent logical offsets of pages. In FIG. 3B, it is supposed that each block includes four physical pages.

The copy merge is typically performed in the case where a previous data block includes a valid page VP and an invalid page IP, and the number of valid pages VP in a previous log block is different from the number of physical pages in the previous log block. In the copy merge, the valid page VP in the previous data block may be copied to a free page FP in the previous log block, and then the previous log block may be switched to a new data block. Further, the valid page VP and the invalid page IP may be erased in the previous data block, and thus the previous data block may be switched to a new free block. In some embodiments, the copy merge may be performed in a manner that programs the valid page VP in the previous data block into the previous log block. In this example, the previous data block 331 includes valid pages VPs for the logical offsets 0, 1 and 3 and an invalid page IP for the logical offset 2. As indicated by the arrow, in this example, the data for the logical offset 2 in the previous data block 331 is written into the previous log block 333, and thus the previous log block 333 may include a valid page VP for the logical offset 2. During the copy merge, the valid pages VPs having the logical offsets 0, 1 and 3 are copied to the free pages in the previous log block 333, and then the previous log block is switched to the new data block 343 having valid pages VPs with an order 2, 0, 1 and 3. The previous data block 331 is then switched to a new free block 341 with free pages. In this example, an order of the valid pages VP in the new data block 343 may be determined (e.g., 2, 0, 1, and 3) such that the valid page VP in the previous log block 333 may be fixed and the valid pages VP in the previous data block 331 may follow the valid page VP in the previous log block 333. The previous free block 335 in this example is not switched, and thus stays as a free block (e.g. the new free block 345) after the copy merge. When the valid pages VP of the previous data block are newly programmed into the previous log block, the valid pages VP may be programmed using a program method that is different from a program method of a normal program operation according to the block merge operation of FIG. 1.

Figure 3C:
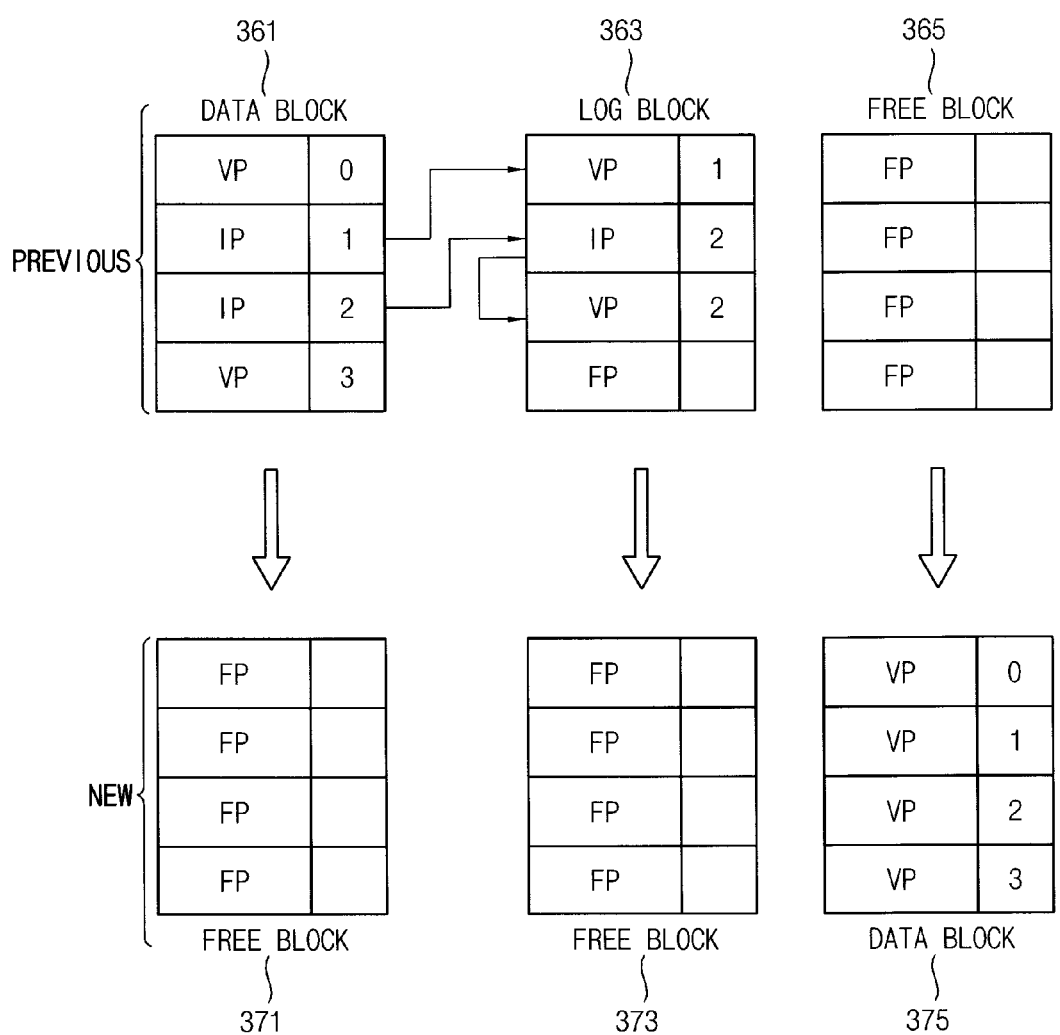

FIG. 3C is a diagram illustrating still another example of blocks merged by a block merge method of FIG. 1.

FIG. 3C illustrates an example of full merge performed according to the block merge method of FIG. 1. In FIG. 3C, IP represents an invalid page, VP represents a valid page, and FP represents a free page. Numbers 0 through 3 represent logical offsets of pages. In FIG. 3C, it is supposed that each block includes four physical pages.

The full merge is typically performed in the case where a previous data block includes a valid page VP and an invalid page IP, and a previous log block includes a valid page VP and an invalid page IP. In the full merge, the valid page VP in the previous data block and the valid page VP in the previous log block may be copied to free pages FP in a selected free block, and then the selected free block may be switched to a new data block. Further, the valid pages VP and the invalid pages IP may be erased in the previous data block and the previous log block, and thus the previous data block and the previous log block may be switched to new free blocks. In some embodiments, the full merge may be performed in a manner that programs the valid pages VP in the previous data block and the previous log block into the selected free block. In this example, the previous data block 301 includes valid pages VPs for the logical offsets 0, and 3 and invalid pages IPs for the logical offsets 1 and 2. As indicated by the arrows, in this example, the data for the logical offsets 1 in the previous data block 361 is written into the previous log block 363, and thus the previous log block 363 may include a valid page VP for the logical offset 2, but the data for the logical offset 2 in the previous data block 361 is written into the previous log block 363 as an invalid page IP for the logical offset 2. The invalid page IP for the logical offset 2 in the previous log block is then copied to another page as a valid page VP for the logical offset 2, as indicated by the arrow. During the full merge, the valid pages VPs from the previous data block (e.g. valid pages VPs for logical offsets 0 and 3) and the valid pages VPs from the previous log block 363 (e.g. valid pages VPs for logical offsets 1 and 2) may be copied to the free pages of the previous free block 365. The valid pages VPs and the invalid pages IPs may be erased in the previous data block 361 and the previous log block 363 to create the new free blocks 371 and 373. In this example, the valid pages VP in the new data block 375 may be sorted into ascending order (e.g., 0, 1, 2, and 3). When the valid pages VP of the previous data block and the previous log block are newly programmed into the selected free block, the valid pages VP may be programmed using a program method that is different from a program method of a normal program operation according to the block merge operation of FIG. 1.

Figure 4:
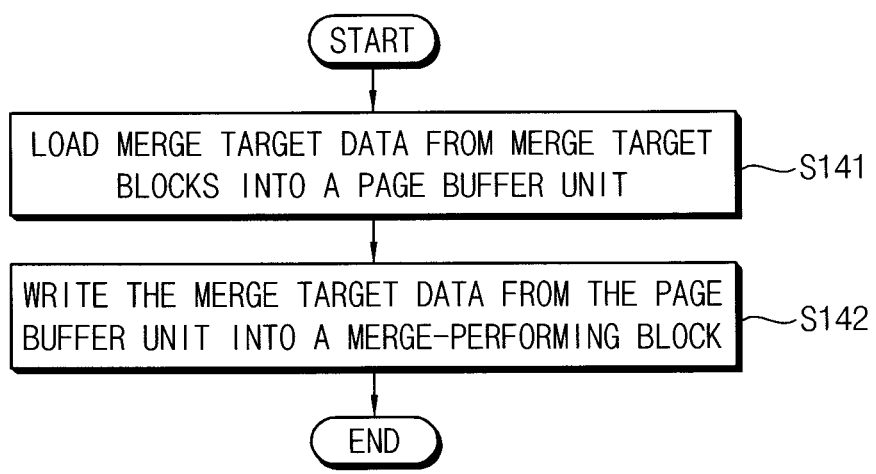
FIG. 4 is a flow chart illustrating an example of a merge step that writes merge target data from merge target blocks into a merge-performing block in a block merge method of FIG. 1.

FIG. 4 is a flow chart illustrating an example of a merge step that writes merge target data from merge target blocks into a merge-performing block in a block merge method of FIG. 1.

Referring to FIG. 4, to merge a plurality of merge target data from merge target blocks into a merge-performing block, the block merge method of FIG. 1 may write the plurality of merge target data from the merge target blocks into the merge-performing block via a page buffer unit. For example, the block merge method of FIG. 1 may load the plurality of merge target data from the merge target blocks into the page buffer unit at operation S141, and may write the plurality of merge target data loaded in the page buffer unit into the merge-performing block at operation S142.

A NAND flash memory device may include a memory cell array having a plurality of single level memory cells (SLC) and/or a plurality of multi level memory cells (MLC), and a page buffer unit that operates as a write driver or as a sense amplifier for the memory cell array according to an operation mode of the NAND flash memory device. The page buffer unit may include a plurality of page buffers. According to the block merge method of FIG. 1, the plurality of merge target data may be loaded from the merge target blocks into the page buffer unit at operation S141. The page buffer unit may operate as the sense amplifier for the memory cell array, and may read the plurality of merge target data from the merge target blocks to load the plurality of merge target data into the page buffers. Subsequently, the plurality of merge target data loaded into the page buffer unit may be written into the merge-performing block at operation S142. The page buffer unit may operate as the write driver for the memory cell array, and a row decoder may apply wordline voltages (e.g., a program voltage and a pass voltage) generated by a voltage generator to wordlines to program the loaded merge target data into the merge-performing block. In some embodiments, the block merge method of FIG. 1 may employ an incremental step pulse program method.

As described above, the block merge method of FIG. 1 may load page data provided from an external device into the page buffer unit, may use a first program method during a normal program operation that writes the loaded page data from the page buffer unit into a target block, may load the plurality of merge target data from the merge target blocks into the page buffer unit, and may use the second program method that is different from the first program method during a block merge operation that writes the loaded merge target data from the page buffer unit into the merge-performing block. Selecting the first program method or the second program method may be performed by changing program parameters, such as incremental step pulse program conditions, verify/read levels, sensing schemes, etc. In some embodiments, the first program method may correspond to a shadow program method, and the second program method may correspond to a reprogram method. That is, the block merge method of FIG. 1 may use different program parameters according to environments and conditions of the normal program operation and the block merge operation.

FIG. 5 is a diagram illustrating a merge step of FIG. 4.

Referring to FIG. 5, a NAND flash memory device includes a memory cell array 120 having first through m-th blocks BLOCK(1) through BLOCK(m) and a page buffer unit 140. For convenience of explanation, other components of the NAND flash memory device are omitted. Each of the first through m-th blocks BLOCK(1) through BLOCK(m) may include a plurality of physical pages, and the page buffer unit 140 may also include a plurality of page buffers of its own to load page data DATA and update page data UPDATA to modify or to change the page data DATA. The first through m-th blocks BLOCK(1) through BLOCK(m) may be defined as data blocks, log blocks, and free blocks by a flash translation layer (FTL).

In a normal program operation of the NAND flash memory device, if the page data DATA are input from an external device (not shown), the page data DATA may be loaded into the page buffers included in the page buffer unit 140 (via PTA), and then the loaded page data DATA may be written into a block (e.g., BLOCK(m−1)) selected among the first through m-th blocks BLOCK(1) through BLOCK(m) using a first program method (via PTB). The block that stores the page data DATA may be defined as a data block. If the update page data UPDATA are input from the external device, the update page data UPDATA may be loaded into the page buffers included in the page buffer unit 140 (via PTA), and then the loaded update page data UPDATA may be written into a block (e.g., BLOCK(m−1)) selected among the first through m-th blocks BLOCK(1) through BLOCK(m) using the first program method (via PTB). The block that stores the update page data UPDATA may be defined as a log block. A block that stores no page data DATA and no update page data UPDATA may be defined as a free block.

Since the NAND flash memory device does not support an overwrite operation, the page data DATA may not be erased from a corresponding block even if the page data DATA are modified or changed by the update page data UPDATA. A page that stores the page data DATA that are modified or changed by the update page data UPDATA may not be accessed, and may be defined as an invalid page. A page that stores the page data DATA that are neither modified nor changed by the update page data UPDATA may be accessed, and may be defined as a valid page. Accordingly, the invalid page and the valid page may coexist in one data block. Similarly, a page that stores the update page data UPDATA that are modified or changed by other update page data UPDATA may not be accessed, and may be defined as an invalid page. A page that stores the update page data UPDATA that are neither modified nor changed by other update page data UPDATA may be accessed, and may be defined as a valid page. Accordingly, the invalid page and the valid page may coexist in one log block.

The NAND flash memory device may periodically or aperiodically perform a block merge operation that merges valid pages distributed in multiple blocks (i.e., data blocks and/or log blocks related to the data blocks) and erases unnecessary invalid pages to obtain free blocks. In the block merge operation, the page data DATA and/or the update page data UPDATA may be loaded into the page buffer unit 140 from data blocks and/or log blocks related to the data blocks that are selected as merge target blocks (e.g., BLOCK(m−1)) among the first through m-th blocks BLOCK(1) through BLOCK(m) (via MTA), and the loaded page data DATA and/or the loaded update page data UPDATA may be written into a merge-performing block (e.g., BLOCK(n)) selected among the first through m-th blocks BLOCK(1) through BLOCK(m) using a second program method (via MTB). The second program method of the block merge operation may have program parameters that are different from program parameters of the first program method of the normal program operation. In some embodiments, the first program method may correspond to a shadow program method, and the second program method may correspond to a reprogram method.

Figure 6A:
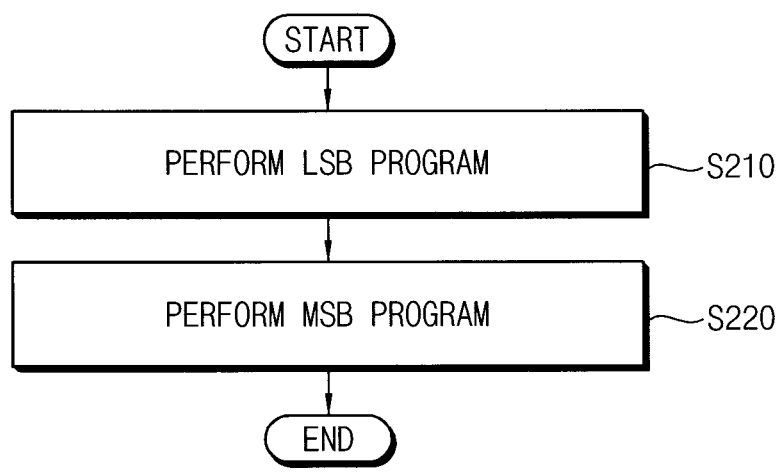
FIG. 6A is a flow chart illustrating an example of a normal program operation that is performed using a shadow program method according to example embodiments of a block merge method illustrated in FIG. 1.

FIG. 6A is a flow chart illustrating an example of a normal program operation that is performed using a shadow program method according to example embodiments of a block merge method illustrated in FIG. 1.

Referring to FIG. 6A, a shadow program method performs a least significant bit (LSB) program on multi level memory cells at operation S210, and then performs a most significant bit (MSB) program on the multi level memory cells at operation S220.

Conventionally, each memory cell stores one bit. However, recently, a NAND flash memory device that stores a plurality of bits per cell has been developed, which results in high density and small size. In the case where each multi level memory cell stores N bits, the multi level memory cells may have $2^N$ threshold voltage states. For example, if each multi level memory cell stores two bits, each multi level memory cell may have one of four threshold voltage states. The four threshold voltage states may correspond to logical values "11", "01", "00" and "10", respectively. For example, a threshold voltage state corresponding to a logic value "10" may have threshold voltages higher than others, and a threshold voltage state corresponding to a logic value "11", which is an erased state, may have threshold voltages lower than others. According to example embodiments, different threshold voltage states may be assigned to various logical values.

A block merge method of FIG. 1 may use the shadow program method as a first program method of a normal program operation to write page data into multi level memory cells. The shadow program method may perform the LSB program on the multi level memory cells, and, thereafter, may perform the MSB program on the multi level memory cells. For example, in the shadow program method, each multi level memory cell may have one of previous threshold voltage states corresponding to N bits by the LSB program, and then each multi level memory cell may have one of final threshold voltage states corresponding to N+1 bits by the MSB program performed based on the previous threshold voltage states corresponding to N bits. The shadow program method may allow stable threshold voltage states, and may be applied to the normal program operation of the NAND flash memory device.

Figure 6B:
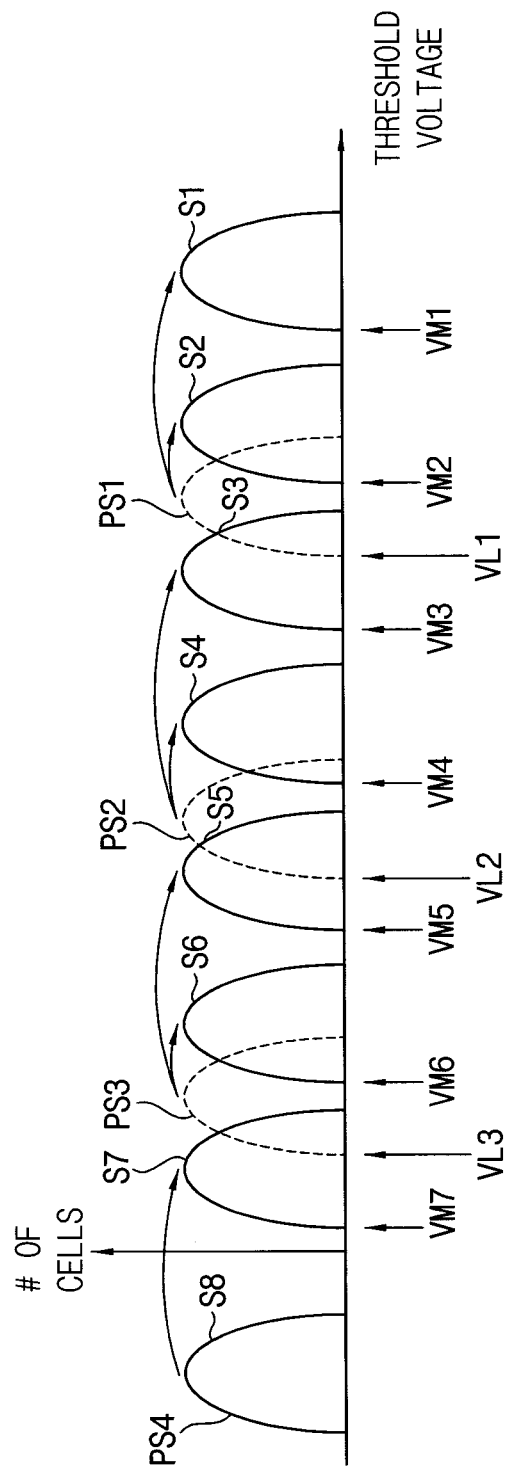
FIG. 6B is a diagram illustrating a shadow program method illustrated in FIG. 6A.

FIG. 6B is a diagram illustrating a shadow program method illustrated in FIG. 6A.

Referring to FIG. 6B, each multi level memory cell may be programmed to have one of first through eighth final threshold voltage states S1 through S8 by a shadow program method. Here, the first final threshold voltage state S1 indicates the highest threshold voltage state among the first through eighth final threshold voltage states S1 through S8, and the eighth final threshold voltage state S8 indicates the lowest threshold voltage state among the first through eighth final threshold voltage states S1 through S8, or an erased state. Although FIG. 6B illustrates multi level memory cells that store 3 bits per cell, example embodiments are not limited thereto.

A block merge method of FIG. 1 may use the shadow program method as a first program method of a normal program operation. The shadow program method may perform a LSB program that programs the multi level memory cells to have four previous threshold voltage states PS1 through PS4. The LSB program may be performed in a manner that repeats a program operation and a verify operation according to an incremental step pulse program method. The verify operation of the LSB program may be performed using first through third verify voltages VL1 through VL3. Subsequently, the shadow program method may perform a MSB program that programs the multi level memory cells to have eight final threshold voltage states S1 through S8 based on the four previous threshold voltage states PS1 through PS4. The MSB program may be performed in a manner that repeats a program operation and a verify operation according to an incremental step pulse program method. The verify operation of the MSB program may be performed using first through seventh verify voltages VM1 through VM7.

Figure 7A:
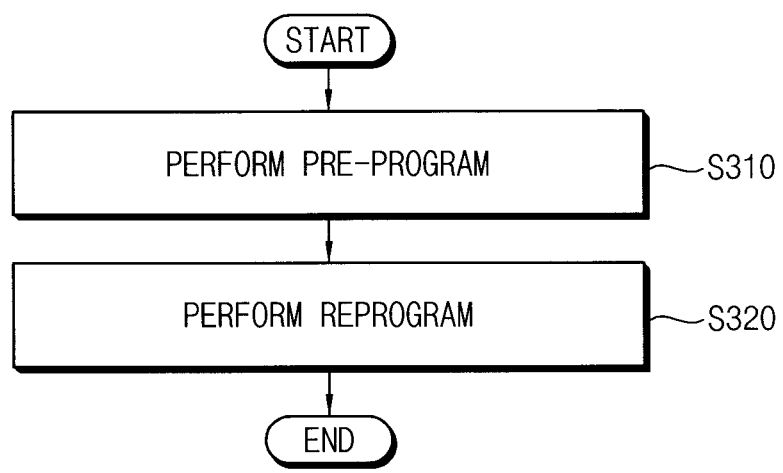
FIG. 7A is a flow chart illustrating an example of a block merge operation that is performed using a reprogram method according to example embodiments of a block merge method illustrated in FIG. 1.

FIG. 7A is a flow chart illustrating an example of a block merge operation that is performed using a reprogram method according to example embodiments of a block merge method illustrated in FIG. 1.

Referring to FIG. 7A, a reprogram method performs a pre-program on multi level memory cells at operation S310, and then performs a reprogram on the multi level memory cells at operation S320.

A block merge method of FIG. 1 may use the reprogram method as a second program method of a block merge operation. The reprogram method may perform the pre-program on the multi level memory cells, and then may perform the reprogram on the multi level memory cells. For example, the multi level memory cells are programmed to have coarse threshold voltage distributions by the pre-program, and then the multi level memory cells are programmed to have fine threshold voltage distributions that are narrower than the coarse threshold voltage distributions, respectively, by the reprogram. Accordingly, the threshold voltage distributions of the multi level memory cells programmed by the reprogram method may not overlap each other, and thus logical values stored in the multi level memory cells can be precisely distinguished. The reprogram method may be rapidly performed, and thus may be applied to the block merge operation of the NAND flash memory device.

Figure 7B:
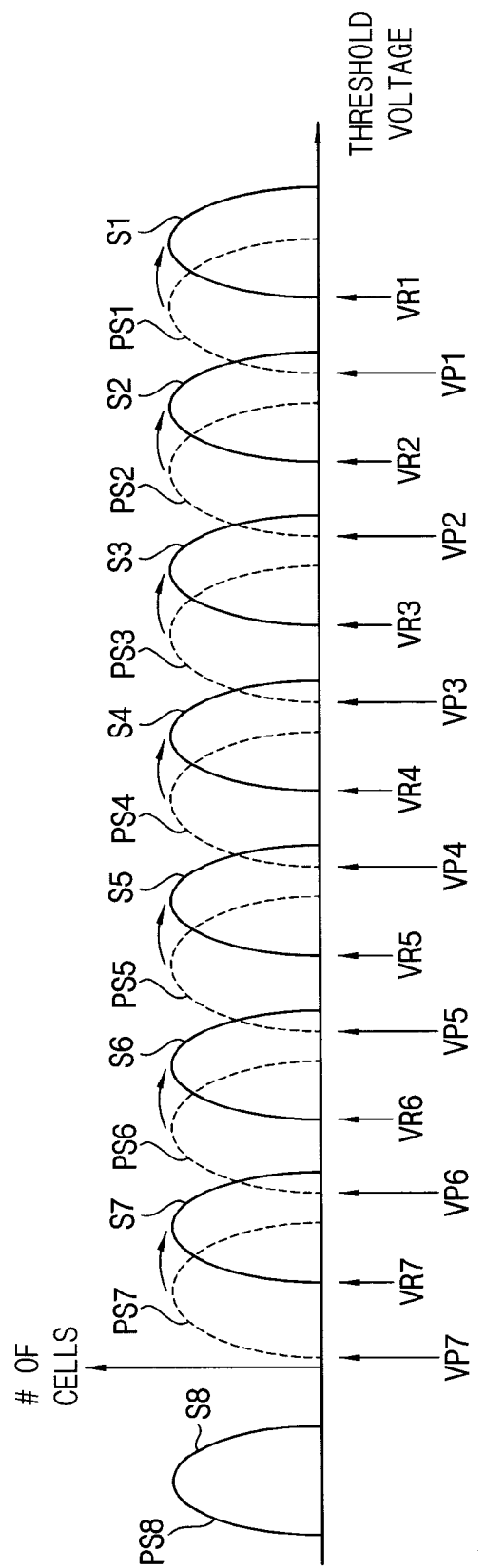
FIG. 7B is a diagram illustrating a reprogram method illustrated in FIG. 7A.

FIG. 7B is a diagram illustrating a reprogram method illustrated in FIG. 7A.

Referring to FIG. 7B, each multi level memory cell is programmed to have one of first through eighth final threshold voltage state S1 through S8 by the reprogram method. Here, the first final threshold voltage state S1 indicates the highest threshold voltage state among the first through eighth final threshold voltage states S1 through S8, and the eighth final threshold voltage state S8 indicates the lowest threshold voltage state among the first through eighth final threshold voltage states S1 through S8, or an erased state. Although FIG. 7B illustrates multi level memory cells that store 3 bits per cell, example embodiments are not limited thereto.

A block merge method of FIG. 1 may use the reprogram method as a second program method of a block merge operation. The reprogram method may perform a pre-program that programs the multi level memory cells to have first through eighth previous threshold voltage states PS1 through PS8 using relatively low first through seventh pre-verify voltages VP1 through VP7. The pre-program may be performed in a manner that repeats a program operation and a verify operation according to an incremental step pulse program method. Subsequently, the reprogram method may perform reprogram that programs the multi level memory cells to have the first through eighth final threshold voltage states S1 through S8 using relatively high first through seventh final verify voltages VR1 through VR7. The reprogram may be performed in a manner that repeats a program operation and a verify operation according to an incremental step pulse program method. The increase of the threshold voltages of the multi level memory cells by the reprogram may be smaller than the increase of the threshold voltages of the multi level memory cells by the pre-program. The reprogram method performs the pre-program using the first through seventh pre-verify voltages VP1 through VP7 having relatively low voltage levels, and then performs the reprogram using the first through seventh final verify voltages VR1 through VR7 having relatively high voltage levels after the threshold voltages are affected by coupling, thereby improving the threshold voltage distributions.

Figure 8:
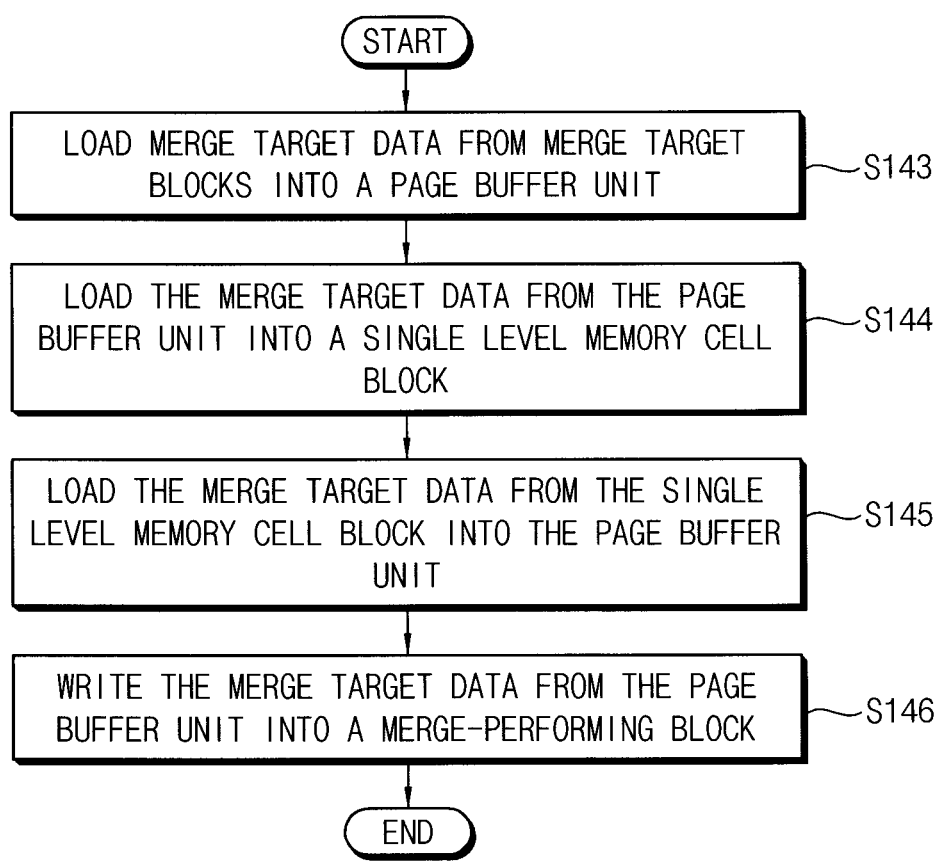
FIG. 8 is a flow chart illustrating another example of a merge step that writes merge target data from merge target blocks into a merge-performing block in a block merge method of FIG. 1.

FIG. 8 is a flow chart illustrating another example of a merge step that writes merge target data from merge target blocks into a merge-performing block in a block merge method of FIG. 1.

Referring to FIG. 8, to merge a plurality of merge target data from merge target blocks into a merge-performing block, the block merge method of FIG. 1 may write the plurality of merge target data from the merge target blocks into the merge-performing block via a page buffer unit and a single level memory cell block. For example, the block merge method of FIG. 1 may load the plurality of merge target data from the merge target blocks into the page buffer unit at operation S143, and may load the plurality of merge target data from the page buffer unit into a single level memory cell block at operation S144. Thereafter, the plurality of merge target data loaded into the single level memory cell block may be again loaded into the page buffer unit at operation S145, and the plurality of merge target data loaded into the page buffer unit may be written into the merge-performing block at operation S146.

A NAND flash memory device may include a memory cell array having a plurality of single level memory cells (SLC) and/or a plurality of multi level memory cells (MLC), and a page buffer unit that operates as a write driver or as a sense amplifier for the memory cell array according to an operation mode of the NAND flash memory device. The page buffer unit may include a plurality of page buffers. In some embodiments, the NAND flash memory device may use an on-chip buffered program method, and the memory cell array may include the single level memory cell block that is substituted for a buffer (e.g., an SRAM buffer) typically included in a memory controller for controlling the NAND flash memory device. In this case, the NAND flash memory device may be controlled by the memory controller that does not include the buffer.

According to the block merge method of FIG. 1, the plurality of merge target data may be loaded from the merge target blocks into the page buffer unit at operation S143. The page buffer unit may operate as the sense amplifier for the memory cell array, and may read the plurality of merge target data from the merge target blocks to load the plurality of merge target data into the page buffers. Subsequently, the plurality of merge target data loaded into the page buffer unit may be loaded into the single level memory cell block at operation S144, and then the plurality of merge target data loaded into the single level memory cell block may be again loaded into the page buffer unit at operation S145. The minimum unit of program of the page buffer unit may be different from the minimum unit of program of the single level memory cell block. In some embodiments, the minimum unit of program of the page buffer unit may be greater than the minimum unit of program of the single level memory cell block. Subsequently, the plurality of merge target data loaded into the page buffer unit may be written into the merge-performing block at operation S146. The page buffer unit may operate as the write driver for the memory cell array, and a row decoder may apply wordline voltages (e.g., a program voltage and a pass voltage) generated by a voltage generator to wordlines to program the loaded merge target data into the merge-performing block. In some embodiments, the block merge method of FIG. 1 may employ an incremental step pulse program method.

As described above, the block merge method of FIG. 1 may load page data provided from an external device into the page buffer unit, may load the page data from the page buffer unit into the single level memory cell block, may again load the page data from the single level memory cell block into the page buffer unit, and may use a first program method during a normal program operation that writes the loaded page data from the page buffer unit into a target block. Thereafter, the block merge method of FIG. 1 may load the plurality of merge target data from the merge target blocks into the page buffer unit, may load the plurality of merge target data from the page buffer unit into the single level memory cell block, may again load the plurality of merge target data from the single level memory cell block into the page buffer unit, and may use the second program method that is different from the first program method during a block merge operation that writes the loaded merge target data from the page buffer unit into the merge-performing block. Selecting the first program method or the second program method may be performed by changing program parameters, such as incremental step pulse program conditions, verify/read levels, sensing schemes, etc. In some embodiments, the first program method may correspond to an on-chip buffered program method using a first incremental step pulse of a relatively low voltage level, and the second program method may correspond to the on-chip buffered program method using a second incremental step pulse of a relatively high voltage level. That is, the block merge method of FIG. 1 may use different program parameters according to environments and conditions of the normal program operation and the block merge operation.

Figure 9:
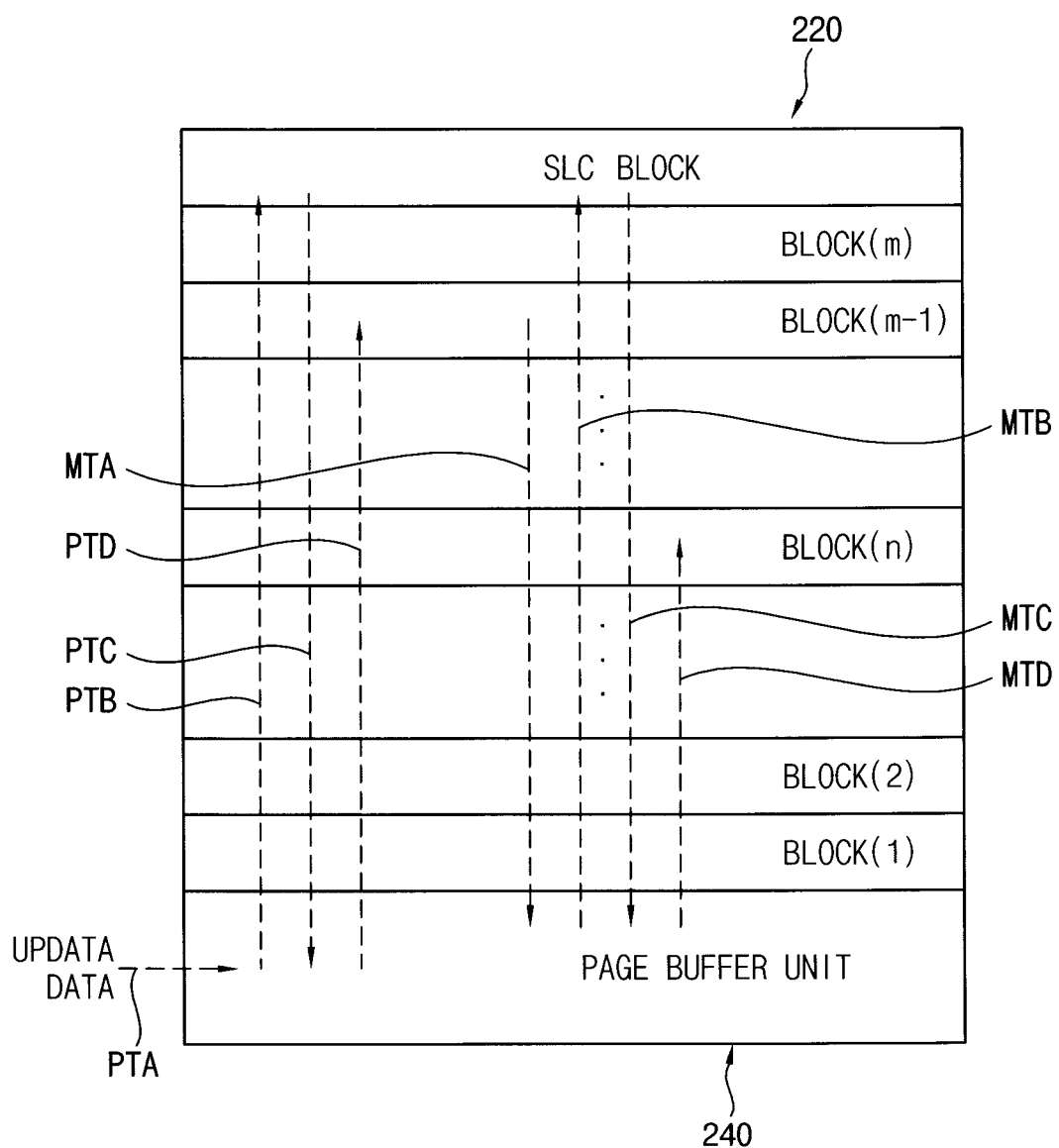
FIG. 9 is a diagram illustrating a merge step of FIG. 8.

FIG. 9 is a diagram illustrating a merge step of FIG. 8.

Referring to FIG. 9, a NAND flash memory device includes a memory cell array 220 having first through m-th blocks BLOCK(1) through BLOCK(m) and a single level memory cell block SLC BLOCK, and a page buffer unit 240. For convenience of explanation, other components of the NAND flash memory device are omitted. Each of the first through m-th blocks BLOCK(1) through BLOCK(m) may include a plurality of physical pages, and the page buffer unit 240 may include a plurality of page buffers to load page data DATA and update page data UPDATA to modify or to change the page data DATA. The first through m-th blocks BLOCK(1) through BLOCK(m) of the memory cell array 220 may include a plurality of multi level memory cells, and the single level memory cell block SLC BLOCK may include a plurality of single level memory cells. The first through m-th blocks BLOCK(1) through BLOCK(m) may be defined as data blocks, log blocks, and free blocks by a flash translation layer (FTL).

The NAND flash memory device may perform a normal program operation and a block merge operation using an on-chip buffered program method. For the on-chip buffered program method, the memory cell array 220 may include the first through m-th blocks BLOCK(1) through BLOCK(m) including the multi level memory cells and the single level memory cell block SLC BLOCK including the single level memory cells. The single level memory cell block SLC BLOCK operating at relatively high speed and having relatively low cell density may store one bit per memory cell. However, the first through m-th blocks BLOCK(1) through BLOCK(m) operating at relatively low speed and having relatively high cell density may store two or more bits per memory cell. As described above, the NAND flash memory device using the on-chip buffered program method may employ the single level memory cell block SLC BLOCK instead of an internal buffer of a memory controller.

In the normal program operation of the NAND flash memory device using the on-chip buffered program method, if the page data DATA are input from an external device (not shown), the page data DATA may be loaded into the page buffers included in the page buffer unit 240 in the minimum unit of program (via PTA), and then the page data DATA may be loaded in the single level memory cell block SLC BLOCK of the memory cell array 220 (via PTB). In some embodiments, an interleaving operation may be performed on the page data DATA input from the external device, the page data DATA on which the interleaving operation is performed may be loaded into the page buffers included in the page buffer unit 240 in the minimum unit of program (via PTA), and then the page data DATA may be loaded in the single level memory cell block SLC BLOCK of the memory cell array 220 (via PTB). The minimum unit of program may be set according to various conditions, such as type of the program method, the number of bits per cell, whether the interleaving operation is performed, etc. For example, in the case where the interleaving operation is not performed, the minimum unit of program may correspond to one page data DATA.

After the page data DATA are loaded into the single level memory cell block SLC BLOCK, the page data DATA in the single level memory cell block SLC BLOCK may be again loaded into the page buffers included in the page buffer unit 240 (via PTC). The minimum unit of program of the page buffer unit may be greater than the minimum unit of program of the single level memory cell block. Subsequently, the page data DATA loaded into the page buffer unit 240 may be written into a block (e.g., BLOCK(m−1)) selected among the first through m-th blocks BLOCK(1) through BLOCK(m) using a first program method (via PTD). The block that stores the page data DATA may be defined as a data block. Further, if the update page data UPDATA are input from the external device, the update page data UPDATA may be written into a block selected among the first through m-th blocks BLOCK(1) through BLOCK(m) using the first program method in a similar manner described above. The block that stores the update page data UPDATA may be defined as a log block. A block that stores no page data DATA and no update page data UPDATA may be defined as a free block.

Since the NAND flash memory device does not support an overwrite operation, the page data DATA may not be erased from a corresponding block although the page data DATA are modified or changed by the update page data UPDATA. A page that stores the page data DATA that are modified or changed by the update page data UPDATA may not be accessed, and may be defined as an invalid page. A page that stores the page data DATA that are neither modified nor changed by the update page data UPDATA may be accessed, and may be defined as a valid page. Accordingly, the invalid page and the valid page may coexist in one data block. Similarly, a page that stores the update page data UPDATA that are modified or changed by other update page data UPDATA may not be accessed, and may be defined as an invalid page. A page that stores the update page data UPDATA that are neither modified nor changed by other update page data UPDATA may be accessed, and may be defined as a valid page. Accordingly, the invalid page and the valid page may coexist in one log block.

The NAND flash memory device using the on-chip buffered program method may periodically or aperiodically perform the block merge operation that merges valid pages distributed in multiple blocks (i.e., data blocks and/or log blocks related to the data blocks) and erases unnecessary invalid pages to obtain free blocks. In the block merge operation, the page data DATA and/or the update page data UPDATA may be loaded into the page buffers included in the page buffer unit 240 from data blocks and/or log blocks related to the data blocks that are selected as merge target blocks (e.g., BLOCK(m−1)) among the first through m-th blocks BLOCK(1) through BLOCK(m) (via MTA), and the page data DATA and/or the update page data UPDATA loaded into the page buffer unit 240 may be loaded into the single level memory cell block SLC BLOCK (via MTB). Thereafter, the page data DATA and/or the update page data UPDATA loaded into the single level memory cell block SLC BLOCK may be again loaded into the page buffers included in the page buffer unit 240 (via MTC), and then the page data DATA and/or the update page data UPDATA loaded into the page buffer unit 240 may be written into a merge-performing block (e.g., BLOCK(n)) selected among the first through m-th blocks BLOCK(1) through BLOCK(m) using a second program method (via MTD). The second program method of the block merge operation may have program parameters that are different from program parameters of the first program method of the normal program operation. In some embodiments, the first program method may correspond to the on-chip buffered program method using a first incremental step pulse of a relatively low voltage level, and the second program method may correspond to the on-chip buffered program method using a second incremental step pulse of a relatively high voltage level.

Figure 10:
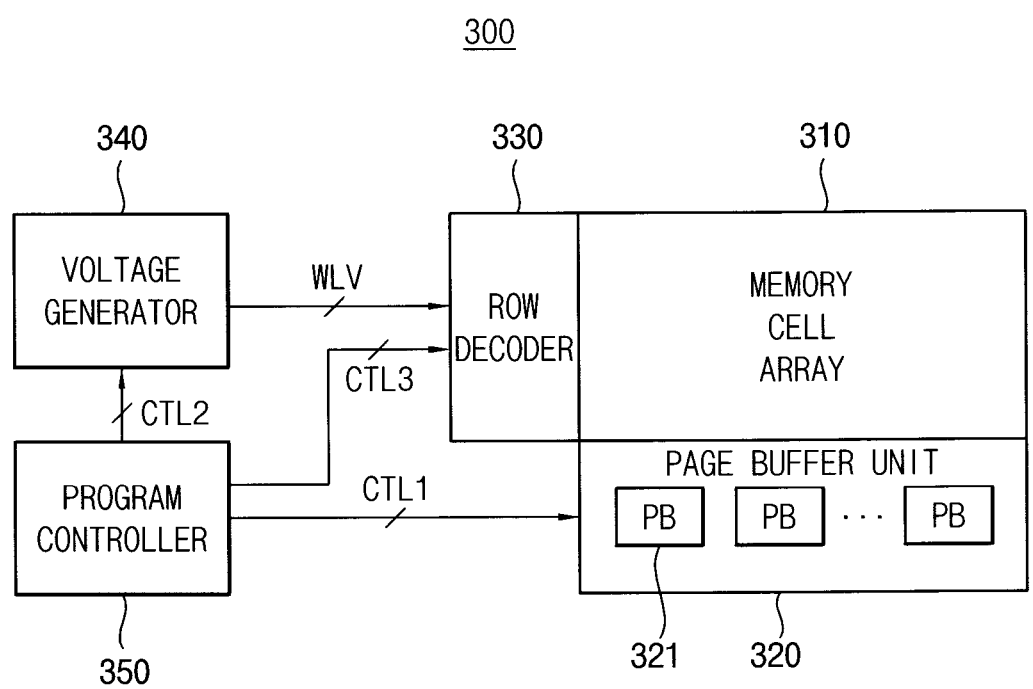
FIG. 10 is a block diagram illustrating a semiconductor memory device according to example embodiments.

FIG. 10 is a block diagram illustrating a semiconductor memory device according to example embodiments.

Referring to FIG. 10, a semiconductor memory device 300 includes a memory cell array 310, a page buffer unit 320, a row decoder 330, a voltage generator 340 and a program controller 350. In some embodiments, the semiconductor memory device 300 may further include a pass-fail detector that verifies threshold voltage states during an incremental step pulse program. Although FIG. 10 illustrates a NAND flash memory device as an example of the semiconductor memory device 300, example embodiments of the present general inventive concept are not limited thereto. Rather, the semiconductor memory device 300 may be construed as semiconductor memory devices that write data into a memory cell array on a page basis.

The memory cell array 310 may include a plurality of memory cells coupled to a plurality of wordlines and a plurality of bitlines. In some embodiments, the memory cell array 310 may include multi level memory cells that store a plurality of bits per memory cell. The memory cells of memory cell array 310 may be programmed using a first program method during a normal program operation of the semiconductor memory device 300, and may be programmed using a second program method that is different from the first program method during a block merge operation of the semiconductor memory device 300. The first program method and the second program method may have different program parameters, such as incremental step pulse program conditions, verify/read levels, sensing schemes, etc. In some embodiments, the first program method may correspond to a shadow program method, and the second program method may correspond to a reprogram method. In other embodiments, the first program method may correspond to an on-chip buffered program method using a first incremental step pulse of a relatively low voltage level, and the second program method may correspond to the on-chip buffered program method using a second incremental step pulse of a relatively high voltage level.

The page buffer unit 320 may operate as a write driver or as a sense amplifier according to an operation mode of the semiconductor memory device 300. The page buffer unit 320 may include a plurality of page buffers 321 to load page data that are input from an external device (not shown) or to load page data from a valid page of merge target blocks. Each page buffer 321 included in the page buffer unit 320 may include a plurality of data latches. For example, the page buffer unit 320 may operate as the sense amplifier during a read operation mode of the semiconductor memory device 300, may operate as the write driver during a write operation mode of the semiconductor memory device 300, and may operate as the sense amplifier and the write driver during a block merge operation mode of the semiconductor memory device 300. In some embodiments, the page buffer unit 320 may provide a function of a column decoder that selects the bitlines, and may further provide a function of a pass-fail detector that verifies threshold voltages in the case where the semiconductor memory device 300 employs an incremental step pulse method.

The row decoder 330 may apply wordline voltages WLV provided from the voltage generator 340 to the wordlines based on a row address. The row decoder 330 may apply the wordline voltages WLV, such as a program voltage, a pass voltage, a verify voltage, a read voltage, etc., to the wordlines. For example, in the write operation mode of the semiconductor memory device 300, the row decoder 330 may apply the program voltage to a selected wordline, and may apply the pass voltage to unselected wordlines. Further, in the case where the semiconductor memory device 300 employs the incremental step pulse method, the row decoder 330 may apply the verify voltage to the selected wordline during a verify operation. In the read operation mode of the semiconductor memory device 300, the row decoder 330 may apply the read voltage to the selected wordline. Since the block merge operation includes the read operation, the write operation and the erase operation, the row decoder 330 may apply appropriate wordline voltages WLV depending on the read operation mode, the write operation mode and the erase operation mode included in the block merge operation mode.

The voltage generator 340 may generate the wordline voltages WLV applied to the wordlines according to the operation mode of the semiconductor memory device 300. The voltage generator 340 may generate the wordline voltages WLV, such as the program voltage, the pass voltage, the verify voltage, the read voltage, etc., in response to control signals CTL2 provided from the program controller 350. For example, in the write operation mode of the semiconductor memory device 300, the voltage generator 340 may generate the program voltage, the pass voltage and/or the verify voltage. In the read operation mode of the semiconductor memory device 300, the voltage generator 340 may generate the read voltage. The block merge operation may include the read operation, the write operation and the erase operation. However, a program method of a normal write operation may be different from a program method of a write operation included in the block merge operation. Thus, the voltage generator 340 may generate the wordline voltages WLV during the write operation in the block merge operation mode such that the wordline voltages WLV during the write operation in the block merge operation mode are different from the wordline voltages WLV during the normal write operation.

The program controller 350 may select the first program method or the second program method according to the operation mode of the semiconductor memory device 300, and may generate control signals CTL1, CTL2 and CTL3 to control the page buffer unit 320, the row decoder 330 and the voltage generator 340. As described above, the block merge operation may include the read operation, the write operation and the erase operation. The semiconductor memory device 300 may program memory cells using the first program method during the normal write operation, and may program the memory cells using the second program method during the write operation of the block merge operation. For example, the semiconductor memory device 300 may set different program parameters, such as incremental step pulse program conditions, verify/read levels, sensing schemes, etc., depending on the normal write operation or the write operation of the block merge operation. That is, the semiconductor memory device 300 may select the first program method or the second program method by changing the program parameters by outputting the control signals CTL1, CTL2 and CTL3 to the page buffer unit 320, the row decoder 330 and the voltage generator 340.

Figure 11:
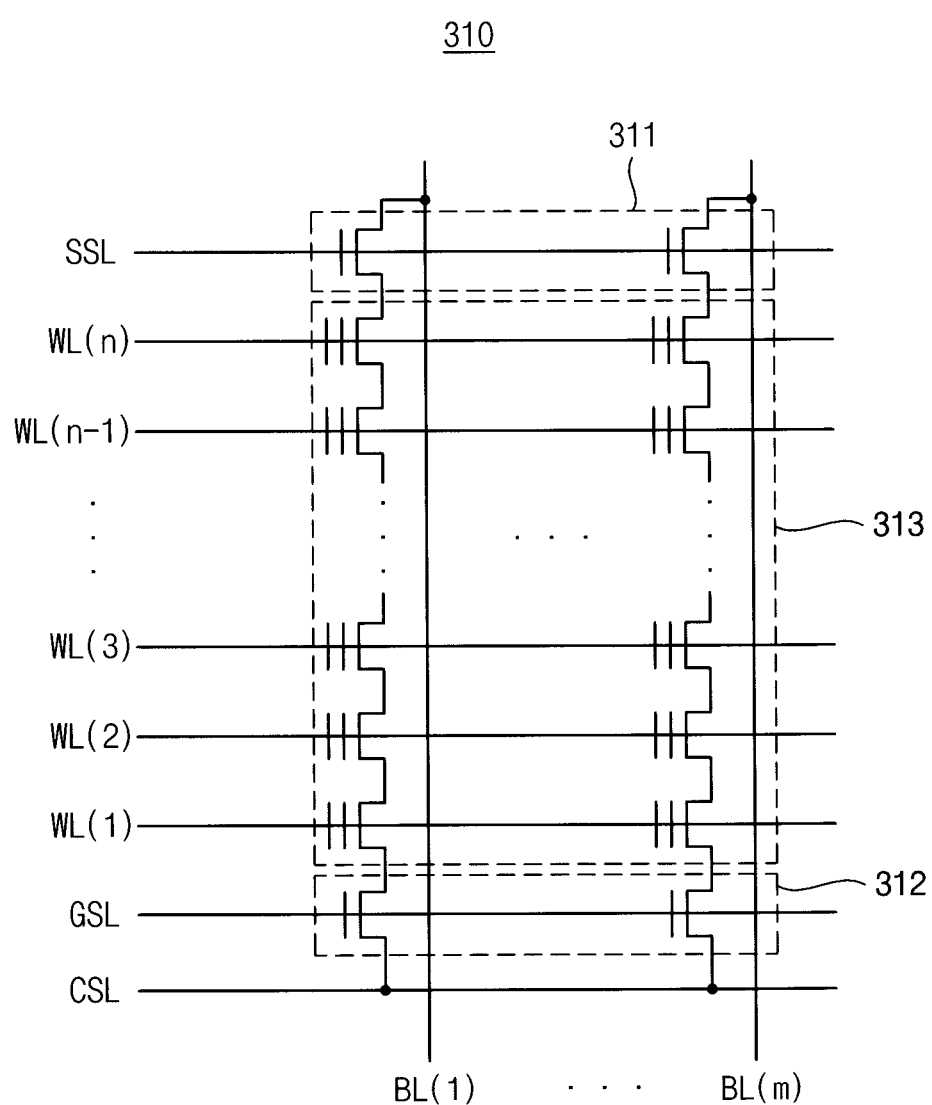
FIG. 11 is a diagram illustrating an example of a memory cell array included in a semiconductor memory device of FIG. 10.

FIG. 11 is a diagram illustrating an example of a memory cell array included in a semiconductor memory device of FIG. 10.

Referring to FIG. 11, a memory cell array 310 includes string select transistors 311, ground select transistors 312 and memory cells 313. In some embodiments, the memory cells 313 may be arranged in a two-dimensional array structure. In other embodiments, the memory cells 313 may be arranged in a three-dimensional vertical array structure.

The string select transistors 311 may be coupled to bitlines BL(1) through BL(m), and the ground select transistors 312 may be coupled to a common source line CSL. The memory cells 313 may be coupled in series between the string select transistors 311 and the ground select transistors 312. The memory cells 313 in the same row may be coupled to the same wordline among wordlines WL(1) through WL(n). For example, 16, 32 or 64 wordlines may be disposed between a string select line SSL and a ground select line GSL. The string select transistors 311 may be coupled to the string select line SSL, and may be controlled by a voltage on the string select line SSL. The ground select transistors 312 may be coupled to the ground select line GSL, and may be controlled by a voltage on the ground select line GSL. The memory cells 313 may be controlled by a voltage on the wordlines WL(1) through WL(n). In some embodiments, the memory cells 313 may include multi level memory cells that store a plurality of bits per memory cell. In some embodiments, each page buffer included in a page buffer unit may be coupled to an odd-numbered bitline and an even-numbered bitline. In this case, the odd-numbered bitlines may form odd-numbered pages, the even-numbered bitlines may form even-numbered pages, and program operations for the odd-numbered pages and the even-numbered pages may be alternately performed. As described above, in the semiconductor memory device 300, a first program method of a normal write operation may be different from a second program method of a block merge operation. For example, a program controller of the semiconductor memory device 300 may select the first program method or the second program method by changing program parameters, such as incremental step pulse program conditions, verify/read levels, sensing schemes, etc.

Figure 12:
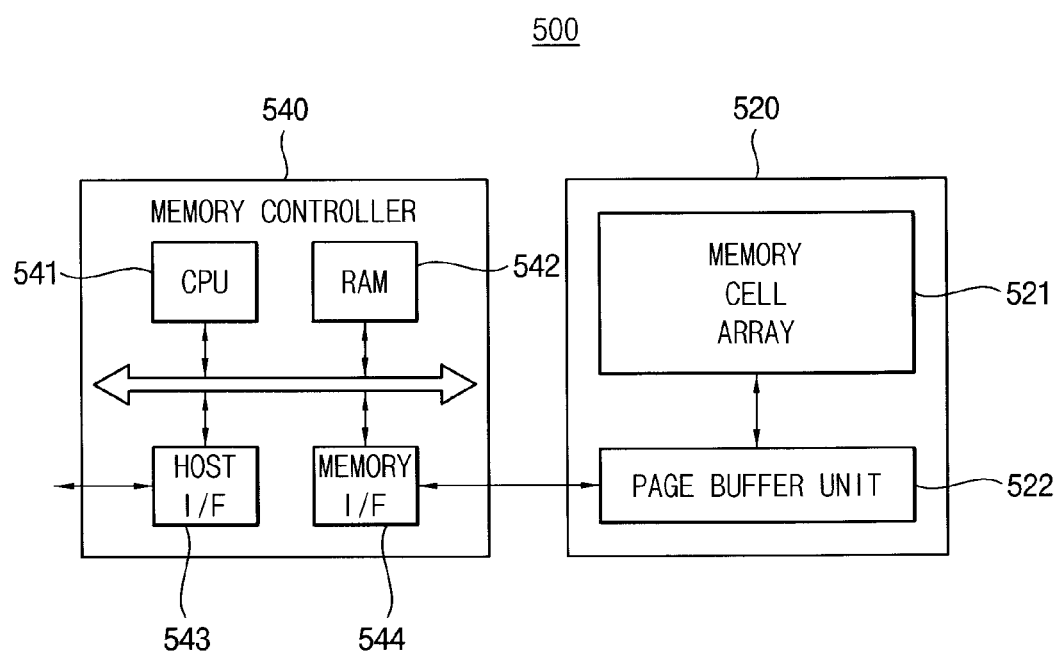
FIG. 12 is a block diagram illustrating a memory system including a semiconductor memory device of FIG. 10.

FIG. 12 is a block diagram illustrating a memory system including a semiconductor memory device of FIG. 10.

Referring to FIG. 12, a memory system 500 includes a semiconductor memory device 520 and a memory controller 540.

The semiconductor memory device 520 may include a memory cell array 521 and a page buffer unit 522. The semiconductor memory device 520 may further include a row decoder 330, a voltage generator 340 and a program controller 350 as illustrated in FIG. 10. In some embodiments, the semiconductor memory device 520 may further include a pass-fail detector for verifying threshold voltage states during an incremental step pulse program. The semiconductor memory device 520 may be, but not limited to, a NAND flash memory device. As described above, the semiconductor memory device 520 may program memory cells using a first program method during a normal write operation, and may program the memory cells using a second program method during a block merge operation. That is, the semiconductor memory device 520 may set different program parameters, such as incremental step pulse program conditions, verify/read levels, sensing schemes, etc., depending on the normal write operation or the block merge operation. In some embodiments, the first program method may correspond to a shadow program method, and the second program method may correspond to a reprogram method. In other embodiments, the first program method may correspond to an on-chip buffered program method using a first incremental step pulse of relatively low voltage level, and the second program method may correspond to the on-chip buffered program method using a second incremental step pulse of relatively high voltage level.

The memory controller 540 may include a central processing unit (CPU) 541, a memory unit 542, a host interface 543, and a memory interface 544. The memory controller 540 may control the semiconductor memory device 520, and may transfer data between external host devices and the semiconductor memory device 520. The CPU 541 may control the memory unit 542, the host interface 543, and the memory interface 544 for processing and transferring the data. The memory unit 542 may temporarily store data provided from the external host devices, or data provided from the semiconductor memory device 520. For example, the memory unit 542 may be implemented with a dynamic random access memory (DRAM) device, a static random access memory (SRAM) device, a phase random access memory (PRAM) device, a ferroelectric random access memory (FRAM) device, a resistive random access memory (RRAM) device, and/or a magnetic random access memory (MRAM) device.

The host interface 543 enables communication with the external host devices, and the memory interface 544 enables communication with the semiconductor memory device 520. In addition, the CPU 541 may control the semiconductor memory device 520 via the memory interface 544.

According to various embodiments, the host interface 543 may interact with the external host devices using a standard protocol, such as universal serial bus (USB), multimedia card (MMC), peripheral component interconnection (PCI), peripheral component interconnection express (PCI-EXPRESS), advanced technology attachment (ATA), serial advanced technology attachment (SATA), parallel advanced technology attachment (PATA), small computer system interface (SCSI), enhanced small disk interface (ESDI), serial attached small computer system interface (SAS), integrated drive electronics (IDE), or the like. The memory interface 544 may interact with the semiconductor memory device 520 using a standard protocol, such as NAND interface protocol. The memory controller 540 may be included in the semiconductor memory device 520, for example. The semiconductor memory device 520 having the built-in memory controller 540 may be referred to as One-NAND memory device.

In some embodiments, the memory system 500 may be incorporated into a memory card, a solid state drive (SSD), or other potentially standalone memory product. The semiconductor memory device 520 and/or the memory controller 540 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Figure 13:
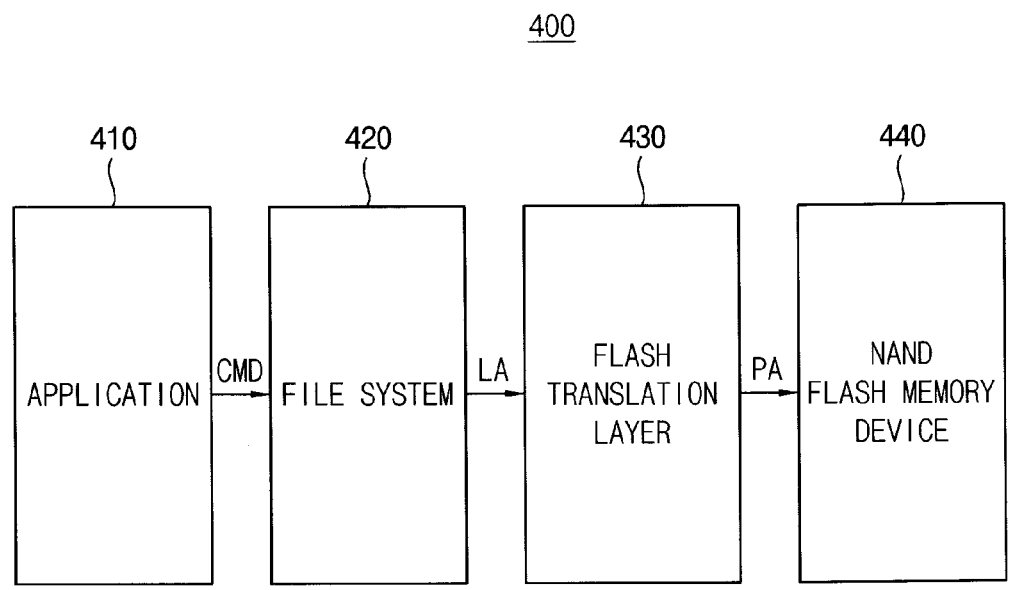
FIG. 13 is a block diagram illustrating a software configuration of a memory system of FIG. 12.

FIG. 13 is a block diagram illustrating a software configuration of a memory system of FIG. 12.

Referring to FIG. 13, a software configuration 400 of a memory system 500 of FIG. 12 includes an application 410, a file system 420, a flash translation layer 430 and a NAND flash memory device 440. Although FIG. 13 illustrates the NAND flash memory device 440, example embodiments of the present general inventive concept are not limited thereto, and may be applied to various semiconductor memory devices that write data into a memory cell array on a page basis.

The software configuration 400 of a memory system 500 of FIG. 12 may have a hierarchical structure of an order of the application 410, the file system 420, the flash translation layer 430 and the NAND flash memory device 440. For example, if the application 410 generates a command CMD required to perform an operation, the file system 420 may output a logical address LA based on the command CMD to access memory cells in the NAND flash memory device 440. The flash translation layer 430 may receive the logical address LA from the file system 420, may convert the logical address LA into the physical address PA based on an internal address mapping table, and may provide the physical address PA to the NAND flash memory device 440. In some embodiments, the address mapping table may include a block mapping table for converting a logical block number into a physical block number and/or a page mapping table for converting a logical page number into a physical page number. The NAND flash memory device 400 may access the respective memory cells based on the physical address PA provided from the flash translation layer 430. Address mapping of the flash translation layer 430 may be classified according to unit of mapping. For example, the address mapping of the flash translation layer 430 may be classified into page mapping that performs the address mapping on a page basis, block mapping that performs the address mapping on a block basis and a mixed mapping that performs the page mapping and the block mapping.

Figure 14:
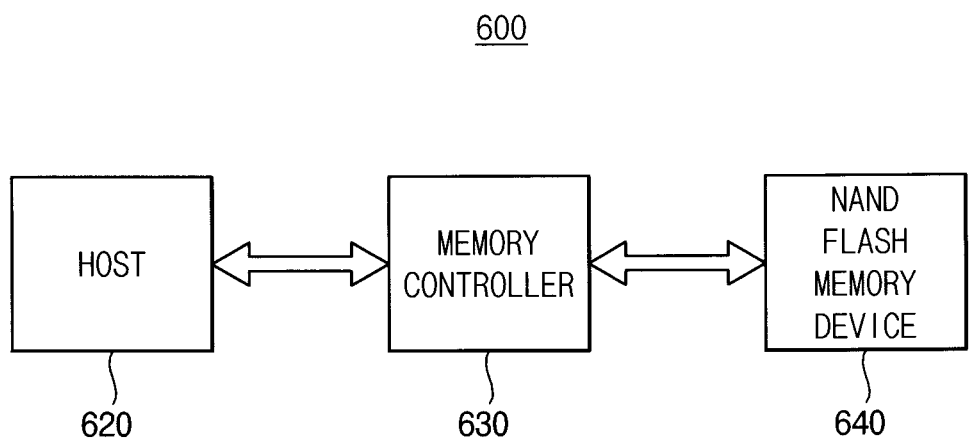
FIG. 14 is a block diagram illustrating an example of a memory system of FIG. 12.

FIG. 14 is a block diagram illustrating an example of a memory system of FIG. 12.

Referring to FIG. 14, a memory system 600 includes a host device 620, a memory controller 630 and one or more NAND flash memory devices 640.

The memory controller 630 may be located between the host device 620 and the NAND flash memory devices 640. The memory controller 630 and the NAND flash memory devices 640 may communicate with each other through a signal channel or multiple channels. The memory controller 630 may be implemented as a separate device from the host device 620 and the NAND flash memory devices 640, and may include a CPU 541, a memory unit 542, a host interface 543 and a memory interface 544 as illustrated in FIG. 12. In some embodiments, the host interface 543 may interact with the host device 620 using a standard protocol, such as universal serial bus (USB), multimedia card (MMC), peripheral component interconnection (PCI), peripheral component interconnection express (PCI-EXPRESS), advanced technology attachment (ATA), serial advanced technology attachment (SATA), parallel advanced technology attachment (PATA), small computer system interface (SCSI), enhanced small disk interface (ESDI), serial attached small computer system interface (SAS), integrated drive electronics (IDE), or the like. The memory interface 544 may interact with the NAND flash memory devices 640 using a standard protocol, such as NAND interface protocol. Such an implementation may allow a general-purpose memory controller 630 that employs the standard protocols between the host device 620 and the host interface 543 and between the NAND flash memory devices 640 and the memory interface 544.

Figure 15:
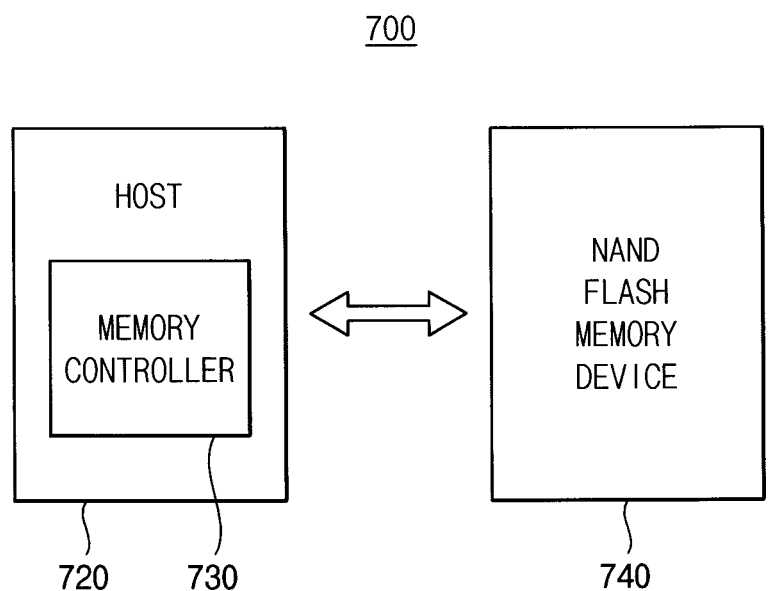
FIG. 15 is a block diagram illustrating another example of a memory system of FIG. 12.

FIG. 15 is a block diagram illustrating another example of a memory system of FIG. 12.

Referring to FIG. 15, a memory system 700 includes a host device 720 having a built-in memory controller 730, and one or more NAND flash memory devices 740.

The memory controller 730 may be located in the host device 720. The memory controller 730 and the NAND flash memory devices 740 may communicate with each other through a signal channel or multiple channels. Since the memory controller 730 is built in the host device 720, the memory controller 730 may not include a host interface 543 illustrated in FIG. 12, or may interact with the host device 720 using an unstandardized protocol. Further, the memory controller 730 may not include a CPU 541 illustrated in FIG. 12, and a host processor of the host device 720 may perform the function of the CPU 541. In some embodiments, the host interface 543 may interact with the host device 720 using an unstandardized protocol, and a memory interface 544 may interact with the NAND flash memory devices 740 using a standard protocol. Thus, an appropriate protocol can be used between the host device 720 and the memory controller 730, and the interaction can be performed inside the host device 720, which results in fast operations.

Figure 16:
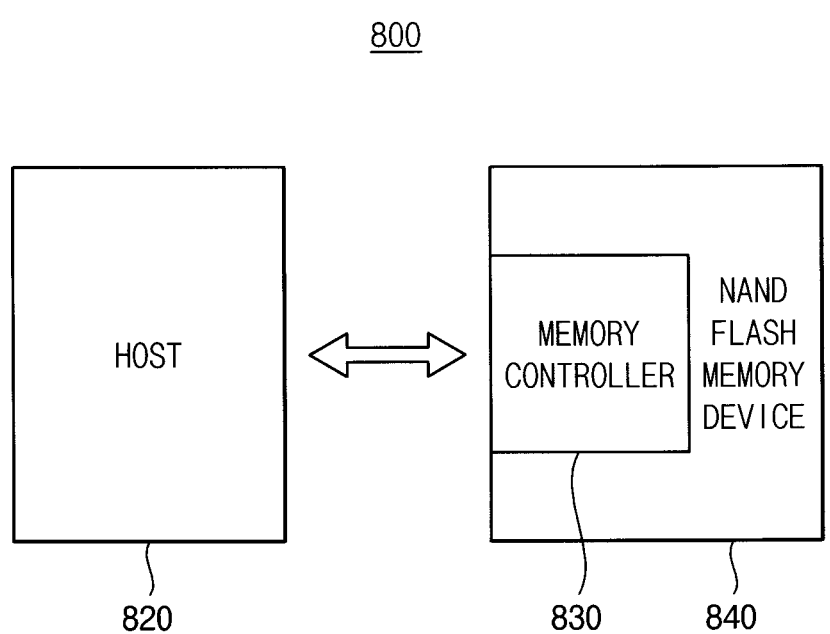
FIG. 16 is a block diagram illustrating still another example of a memory system of FIG. 12.

FIG. 16 is a block diagram illustrating still another example of a memory system of FIG. 12.

Referring to FIG. 16, a memory system 800 includes a host device 820 and one or more NAND flash memory devices 840, each having a built-in memory controller 830.

The memory controller 830 may be located in each NAND flash memory device 840. The memory controller 830 and the NAND flash memory devices 840 may communicate with each other through a signal channel or multiple channels. Since the memory controller 830 is built in each NAND flash memory device 840, the memory controller 830 may not include a memory interface 544 illustrated in FIG. 12, or may interact with the NAND flash memory devices 840 using an unstandardized protocol. Further, a CPU 541 (see, e.g., FIG. 12) of the memory controller 830 may control the NAND flash memory devices 840. In some embodiments, a host interface 543 illustrated in FIG. 12 may interact with the host device 820 using an standard protocol, such as universal serial bus (USB), multimedia card (MMC), peripheral component interconnection (PCI), peripheral component interconnection express (PCI-EXPRESS), advanced technology attachment (ATA), serial advanced technology attachment (SATA), parallel advanced technology attachment (PATA), small computer system interface (SCSI), enhanced small disk interface (ESDI), serial attached small computer system interface (SAS), integrated drive electronics (IDE), etc., and the memory interface 544 may interact with the NAND flash memory devices 840 using an unstandardized protocol. Thus, an appropriate protocol can be used between the NAND flash memory devices 840 and the memory controller 830, and the interaction can be performed inside the NAND flash memory devices 840, which results in fast operations. The semiconductor memory device 840 having the built-in memory controller 830 may be referred to as One-NAND memory device.

FIG. 17 is a block diagram illustrating a computing system including a memory system of FIG. 12.

Referring to FIG. 17, a computing system 900 includes a processor 910, a memory device 920, a user interface 930, a power supply 940, and a memory system 950.

The processor 910 performs calculations, or computing functions for various tasks. For example, the processor 910 may be a microprocessor or a CPU. The processor 910 may be coupled to the memory device 920 via an address bus, a control bus, and/or a data bus. For example, the memory device 920 may be implemented by a DRAM device, a SRAM device, a PRAM device, a FRAM device, a RRAM device, and/or a MRAM device. The processor 910 may be coupled to an extended bus, such as a peripheral component interconnection (PCI) bus. The processor 910 may control the user interface 930 having at least one input device (e.g., a keyboard, a mouse, etc) and at least one output device (e.g., a printer, a display device, etc). The power supply 940 supplies operation voltages for the computing system 900. According to various embodiments, the computing system 900 may further include an application chipset, a camera image processor (CIS), or the like. The memory system 950 may include a semiconductor memory device 520 and a memory controller 540 illustrated in FIG. 12. In the semiconductor memory device 520, a first program method of a normal write operation may be different from a second program method of a block merge operation.

Although the block merge method according to example embodiments are described in detail above with respect to the NAND flash memory device, the block merge method according to example embodiments may be applied to various semiconductor memory devices. For example, the block merge method according to example embodiments may be applied to all semiconductor memory devices that write data on a page basis. Further, the block merge operation described above may include a copy-back operation of the semiconductor memory device.

The present general inventive concept may be applied to a system having a semiconductor memory device (e.g., a flash memory device). Thus, the present general inventive concept may be applied to a system, such as a desktop computer, a laptop computer, a digital camera, a video camcorder, a cellular phone, a smart phone, a portable multimedia player (PMP), a personal digital assistant (PDA), an MP3 player, a digital television, a solid state drive (SSD), a navigation device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present general inventive concept. Accordingly, all such modifications are intended to be included within the scope of the present general inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of merging blocks in a semiconductor memory device, the method comprising:
writing a plurality of data into one or more first blocks using a first program method;
selecting one or more merge target blocks that are required to be merged among the one or more first blocks;
selecting a merge-performing block for a block merge operation among the one or more first blocks and one or more second blocks;
writing a plurality of merge target data from the merge target blocks into the merge-performing block using a second program method that is different from the first program method; and
selecting between the first program method and the second program method by changing one or more program parameters.

2. The method of claim 1, further comprising:
erasing the plurality of merge target data from the merge target blocks.

3. The method of claim 2, wherein the semiconductor memory device corresponds to a NAND flash memory device including a plurality of single level memory cells or a plurality of multi level memory cells.

4. The method of claim 3, wherein:
the plurality of data and the plurality of merge target data are written on a page basis, and
the plurality of data and the plurality of merge target data are erased on a block basis.

5. The method of claim 1, wherein program parameters of the first program method are different from program parameters of the second program method.

6. The method of claim 1, wherein:
the first program method corresponds to a shadow program method, and
the second program method corresponds to a reprogram method.

7. The method of claim 6, wherein the plurality of merge target data are written from the merge target blocks into the merge-performing block via a page buffer unit.

8. The method of claim 1, wherein:
the first program method corresponds to an on-chip buffered program method using a first incremental step pulse, and
the second program method corresponds to the on-chip buffered program method using a second incremental step pulse.

9. The method of claim 8, wherein the plurality of merge target data are written from the merge target blocks to the merge-performing block via a page buffer unit and a single level memory cell block.

10. The method of claim 8, wherein the first incremental step pulse has a voltage level lower than that of the second incremental step pulse.

11. A method of merging blocks in a semiconductor memory device, the method comprising:
loading an external data from an external device into a buffer unit;
writing the external data from the buffer unit into a merge target block as a merge target data using a first program method, the merge target block being a single level memory cell block;
loading the merge target data from the merge target block into the buffer unit; and
writing the merge target data from the buffer unit into a merge-performing block using a second program method different from the first program method, the merge-performing block being a multi level memory cell block,
wherein the first program method uses a first incremental step pulse and the second program method uses a second incremental step pulse, and
wherein the first incremental step pulse and the second incremental step pulse have different voltage levels.

12. The method of claim 11, wherein the merge target block operates at a higher speed and has a lower cell density than the merge-performing block.

13. The method of claim 11, wherein the first program method and the second program method have different parameters, the parameters including at least one of incremental step pulse program (ISPP) conditions, verify/read levels, and sensing schemes.

14. The method of claim 6, wherein the shadow program method is configured to perform a least significant bit program that programs the memory cells to have one of previous threshold voltage states corresponding to N bits, and to perform a most significant bit program that programs the memory cells to have one of final threshold voltage states corresponding to N+1 bits.

15. The method of claim 6, wherein the reprogram method is configured to perform a pre-program that programs the memory cells to have coarse threshold voltage distributions, and to perform a reprogram that programs the memory cells to have fine threshold voltage distributions that are narrower than the coarse threshold voltage distributions.

16. A semiconductor memory device, comprising:
a memory cell array including a merge target block and a merge-performing block, the merge target block being a single level memory cell block, and the merge-performing block being a multi-level cell block;
a page buffer unit; and
a program controller configured to control the page buffer unit to load an external data from an external device, to control the page buffer unit to write the loaded external data into the merge target block as a merge target data using a first program method, to control the page buffer unit to the merge target data from the merge target block, to control the page buffer unit to write the loaded merge target data into the merge-performing block using a second program method different from the first program method, and to select between the first program method and the second program method by changing one or more program parameters.

17. The semiconductor memory device of claim 16, wherein the first program method uses a first incremental step pulse and the second program method uses a second incremental step pulse.

18. The semiconductor memory device of claim 17, wherein the first incremental step pulse and the second incremental step pulse have different voltage levels.

19. The semiconductor memory device of claim 16, wherein the one or more program parameters include incremental step pulse program conditions, verify/read levels, and sensing schemes.

* * * * *